US008294063B2

(12) United States Patent
Miki et al.

(10) Patent No.: US 8,294,063 B2

(45) Date of Patent: Oct. 23, 2012

(54) CONNECTOR-USE CONTACT AND PRODUCTION METHOD FOR COMPONENT TO BE SOLDERED

(75) Inventors: Yasunori Miki, Tsu (JP); Hiroshi Yanagida, Kameyama (JP); Shouichi Nagata, Aki-gun (JP); Shin Sato, Tsu (JP); Yoshiyuki Uchinono, Hirakata (JP); Kenji Jonen, Tsu (JP); Masaharu Ishikawa, Suzuka (JP); Hiroshi Iwano, Tsu (JP); Syunichi Nakayama, Tsu (JP)

(73) Assignee: Panasonic Corporation, Osaka (JP)

( * ) Notice: Subject to any disclaimer, the term of this patent is extended or adjusted under 35 U.S.C. 154(b) by 1710 days.

(21) Appl. No.: 10/505,453

(22) PCT Filed: Oct. 10, 2003

(86) PCT No.: PCT/JP03/13094

§ 371 (c)(1), (2), (4) Date: Sep. 1, 2004

(87) PCT Pub. No.: WO2004/034521

PCT Pub. Date: Apr. 22, 2004

(65) Prior Publication Data

US 2005/0103761 A1 May 19, 2005

(30) Foreign Application Priority Data

Oct. 10, 2002 (JP) ................................. 2002-297880
Apr. 18, 2003 (JP) ................................. 2003-114759
Jun. 27, 2003 (JP) ................................. 2003-185748

(51) Int. Cl.
*B23K 26/00* (2006.01)

(52) U.S. Cl. ............ 219/121.85; 219/121.6; 219/121.82

(58) Field of Classification Search ............. 219/121.85, 219/121.6, 121.82
See application file for complete search history.

(56) References Cited

U.S. PATENT DOCUMENTS 4,424,527 A * 1/1984 Rao et al. ...................... 257/786
(Continued)

FOREIGN PATENT DOCUMENTS

JP 60-238489 11/1985
(Continued)

OTHER PUBLICATIONS

English Language Abstract of JP 05-315408.

(Continued)

*Primary Examiner* — M. Alexandra Elve
(74) *Attorney, Agent, or Firm* — Greenblum & Bernstein P.L.C.

(57) ABSTRACT

In a contact for a connector, a metal material id processed to be bent in a predetermined shape in a manner so that a terminal portion is formed in the vicinity of an end and a contacting portion is formed in the vicinity of the other end. A nickel plating layer as a foundation plating layer and a gold plating layer are formed on substantially entire surface of the contact including the terminal portion and the contacting portion. Laser beams are irradiated at a portion between the terminal portion and the contacting portion, and especially in the vicinity of the terminal portion so that the nickel plating layer as the foundation plating layer is unsheathed by removing the gold plating layer or gold in the gold plating layer and nickel in the foundation layer are alloyed. Nickel and the alloy of nickel and gold respectively have low wetting property with respect to solder, so that diffusion of melted solder stops at the portion.

18 Claims, 16 Drawing Sheets

U.S. PATENT DOCUMENTS

| | | | | |
|---|---|---|---|---|
| 4,772,773 | A | 9/1988 | Hashimoto et al. | |
| 5,957,736 | A | 9/1999 | Moriuchi et al. | |
| 6,268,017 | B1 * | 7/2001 | Takeuchi et al. | 427/125 |
| 6,300,678 | B1 * | 10/2001 | Suehiro et al. | 257/697 |
| 6,712,625 | B2 * | 3/2004 | Saito et al. | 439/83 |

FOREIGN PATENT DOCUMENTS

| | | |
|---|---|---|
| JP | 2-15662 | 1/1990 |
| JP | 05-315408 | 11/1993 |
| JP | 05-90835 | 12/1993 |
| JP | 6-204377 | 7/1994 |
| JP | 10-247535 | 9/1998 |
| JP | 2003-45530 | 2/2003 |

OTHER PUBLICATIONS

English Language Abstract of JP 60-238489.
English Language Abstract of JP2003-45530.
English Language Abstract of JP 2-15662.
English Language Abstract of JP 6-204377.

* cited by examiner

CONNECTOR-USE CONTACT AND PRODUCTION METHOD FOR COMPONENT TO BE SOLDERED

TECHNICAL FIELD

The present invention relates to a contact for a connector and a manufacturing method of an element to be soldered such as the contact.

BACKGROUND ART

Generally, in an element to be soldered such as a contact used in a connector, a foundation plating layer of nickel (Ni) is carried out on a metal material such as copper, and a gold plating is further carried out thereon. Owing to carrying out the gold plating on a surface of an element, not only the oxidization of the surface of the element can be prevented, but also a terminal of the element and a wiring pattern on a printed circuit board can easily be soldered owing to high wetting property between gold and solder.

On the other hand, a minute connector used in a mobile equipment such as a mobile phone or a digital still camera has a stacking height of the connector itself is about 1 mm when a socket and a header are coupled. Furthermore, a pitch of an arrangement of the contacts is about 0.4 mm and a height of the contact is about 0.7 mm. Thus, melted solder diffuses along a surface of the contact from the terminal portion due to the high wetting property between gold and solder, so that there is a possibility that the solder adheres at a portion such as a contacting portion to which the solder should not be adhered. Furthermore, there is a possibility that a sufficient connecting strength is not obtained due to deficiency of quantity of the solder adhered in the vicinity of the terminal portion and the wiring pattern on the printed circuit board which are to be soldered, according to the diffusion of the solder.

Therefore, as described in the publication gazettes of Japanese Patent Application 2-15662 and 6-204377, it is proposed to carry out partial plating for carrying gold plating only at the terminal portion and the contacting portion of the contact, surfaces of which are necessary to be plated with gold, so as not to be plated by gold at a portion between the terminal portion and the contacting portion. In this manner, when the foundation layer of nickel plating is unsheathed at the portion between the terminal portion and the contacting portion without plating gold, it is possible to prevent the diffusion of the solder from the terminal portion to the contacting portion due to low wetting property between nickel and solder.

The contact of the connector for mobile equipment, however, is much smaller, so that it is difficult to form the contact one by one and to carry out the plate on the contact entirely. Therefore, a side of a band metal plate is shaped like teeth of a comb, and the teeth portion is bend to have a predetermined shape, so that a semi-finished blank in which a lot of contacts are arranged at a predetermined pitch is formed. The semi-finished blank is dipped in a plating solution while it is conveyed in a lengthwise direction thereof, so that the nickel plating and the gold plating are carried out on entire surfaces of the contacts. Accordingly, it is very difficult to carry out the partial plating on the contacts. Even when the partial plating is forcibly carried out on the contacts, the processes and the plating machine for gold plating become very complex, and the conveying speed of the semi-finished blank becomes much slower, so that the productivity will be dropped.

DISCLOSURE OF INVENTION

A purpose of the present invention is to solve the above-mentioned problem and to provide a contact for a connector and a manufacturing method of an element to be soldered, by which the diffusion of the melted solder from the terminal portion to the contacting portion can be prevented, even though the gold plating is carried out on the entire surface of the contact.

For accomplishing the above-mentioned purpose, a contact for a connector in accordance with an aspect of the present invention comprises: a terminal portion provided in the vicinity of an end and a contacting portion provided in the vicinity of the other end, which are formed by shaping a metal material into a predetermined shape; a foundation plating layer and a gold plating layer or a metal alloy plating layer including gold formed substantially on entire surface of the contact including the terminal portion and the contacting portion; and a diffusion preventing area formed at a portion between the terminal portion and the contacting portion by processing on the gold plating layer or the metal alloy plating layer including gold in which melted solder rarely diffuses due to low wetting property with respect to the solder.

Furthermore, a manufacturing method of an element to be soldered in accordance with an aspect of the present invention comprises: a step of processing a metal material into a predetermined shape for forming a terminal portion in the vicinity of an end thereof; steps of plating a foundation plating layer and a gold plating layer or a metal alloy plating layer including gold on substantially entire surface of the element including the terminal portion and the contacting portion; and a step of irradiating laser beams on the gold plating layer or the metal alloy plating layer including gold at a position between the terminal portion and a portion not to be soldered for forming a diffusion preventing area in which melted solder rarely diffuses due to low wetting property with respect to the solder.

By such a configuration, the diffusion of the melted solder proceeding along the surface of the gold plating layer or the metal alloy plating layer including gold from the terminal portion stops at a boundary between the surface of the gold plating layer or the metal alloy plating layer including gold and the diffusion preventing area, so that the diffusion of the melted solder proceeds no more. Thus, the diffusion of the melted solder rarely reaches to the contacting portion. Furthermore, the diffusion of the melted solder stops at the boundary of the diffusion preventing area, so that it is secured that a predetermined quantity of the solder remains in the vicinity of the terminal portion, and it is assured that the terminal portion and a wiring pattern on a printed circuit board has a sufficient connecting strength. Still furthermore, it is no need to carry out the partial plating as the gold plating layer or the metal alloy plating layer including gold, so that the productivity can be maintained without reducing the conveying speed of the semi-finished blank in the manufacturing processes of the element to be soldered such as the contact.

The diffusion preventing area is formed by the irradiation of the laser beams to the surface of the gold plating layer or the metal alloy plating layer including gold. When a part of or all of the gold plating layer or the metal alloy plating layer including gold at a portion where the laser beam is irradiated is evaporated and removed, the foundation plating layer is unsheathed. Alternatively, when gold and a material of the foundation plating layer are alloyed, the metal alloy layer is unsheathed. Still alternatively, when a material except gold of the metal alloy including gold is diffused on the surface, the diffused layer is unsheathed. The foundation plating layer, the metal alloy layer and the diffused layer respectively have low wetting property with respect to the solder, so that the diffusion of the melted solder proceeding along the surface of the gold plating layer or the metal alloy plating layer including gold from the terminal portion stops at the boundary of the diffusion preventing area.

BEST MODE FOR CARRYING OUT THE INVENTION

Description in Common with the Embodiments

Common portions in the embodiments of the present invention are described with reference to an example of a connector having a stacking height about 1 mm which is used in a mobile equipment such as a mobile phone or a digital still camera. A contact for the connector is described as an example of an element to be soldered. It, however, is not limited by this embodiment, and it is needless to say that it can be applied to another element to be soldered.

Figures 1A, 1B, 1C:
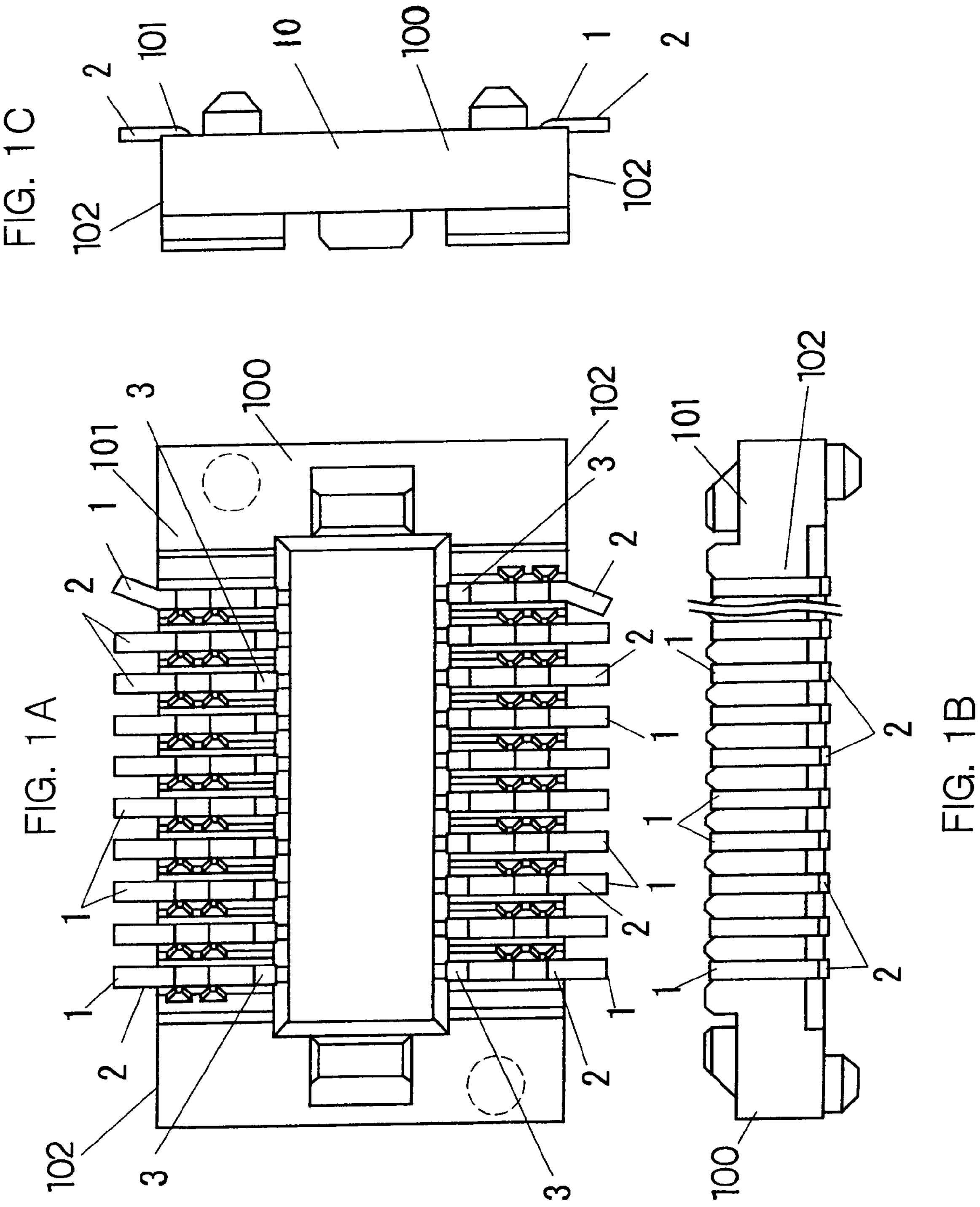
FIGS. 1A to 1C are respectively plan view, front view and side view of a socket constituting a connector in common with embodiments of the present invention.

A configuration of a socket, which constitutes a connector, is shown in FIGS. 1A to 1C. The socket 100 is constituted by a socket base 101 formed of an insulation resin as substantially rectangular frame, and a plurality of sets of contacts 1, which are press fitted or inserted into longer sides 102 of the socket base 101.

Figure 2:
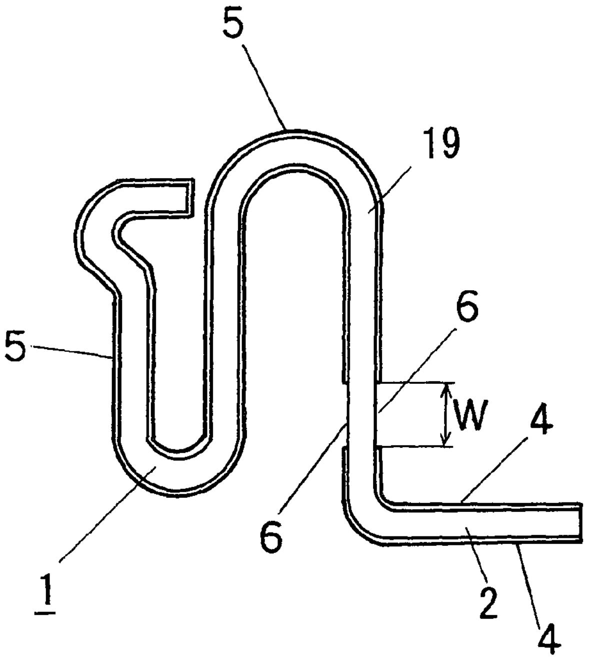
FIG. 2 is a side view showing a basic configuration of a contact for a connector in accordance with the present invention.

A side face of the contact 1 is shown in FIG. 2. Each contact 1 is formed of a band metal plate such as copper having elasticity suitable for a spring and bent to be a predetermined shape, and has a terminal portion 2 to be soldered at an end and a contacting portion 3 at the other end. Foundation plating of nickel is plated on a surface of the contact 1, entirely. Furthermore, a gold plating area 4 at the terminal portion side and a gold plating area 5 at the contacting portion side 3 are formed on the foundation plating layer owing to carrying out gold plating, and a diffusion preventing area 6 is formed between the gold plating areas 4 and 5 for preventing the diffusion of the solder (climbing up of the solder).

Figure 3:
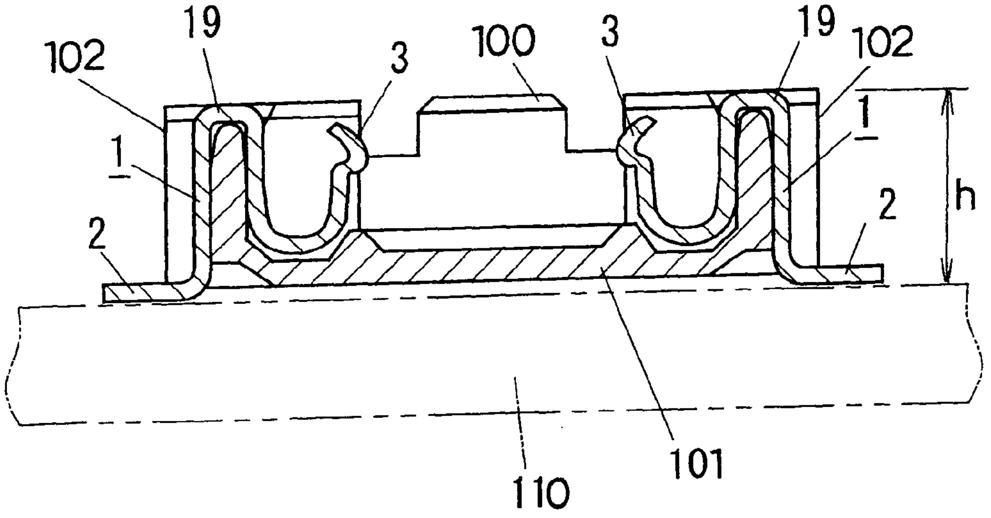
FIG. 3 is a sectional side view showing a state that the above-mentioned socket is mounted on a printed circuit board.

A state of mounting the socket 100 on a printed circuit board 110 is shown in FIG. 3. The terminal portions 2 are protruded below a lower face of the socket base 101, so that the socket 100 will be fixed on the printed circuit board 110 when the terminal portions 2 are soldered on wiring pattern on the printed circuit board 110. At that time, since the gold plating is carried out on the surface of each terminal portion 2, and the gold plating is carried out on the wiring pattern on the printed circuit board 110, similarly, the melted solder flows in gaps between the surface of the terminal portion 2 and the wiring pattern on the printed circuit board 110 and quickly adheres between them. On the other hand, the solder adhered on the surface of the terminal portion 2 diffuses on the gold plating area 4, but cannot diffuse to the other gold plating area 5 owing to the existence of the diffusion preventing area 6. Consequently, the solder never adheres on the contacting portion 3. Similarly, the same goes for the header (not shown) constituting the connector with the socket 100.

Figure 4C:
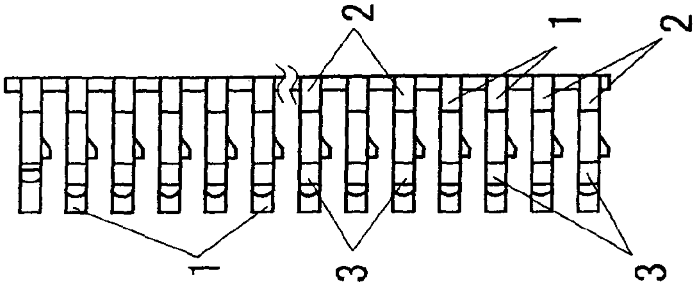
FIGS. 4A to 4C are respectively plan view, side view and front view showing a shape of semi-finished blank of the contact in common with respective embodiments.
Figure 4A:
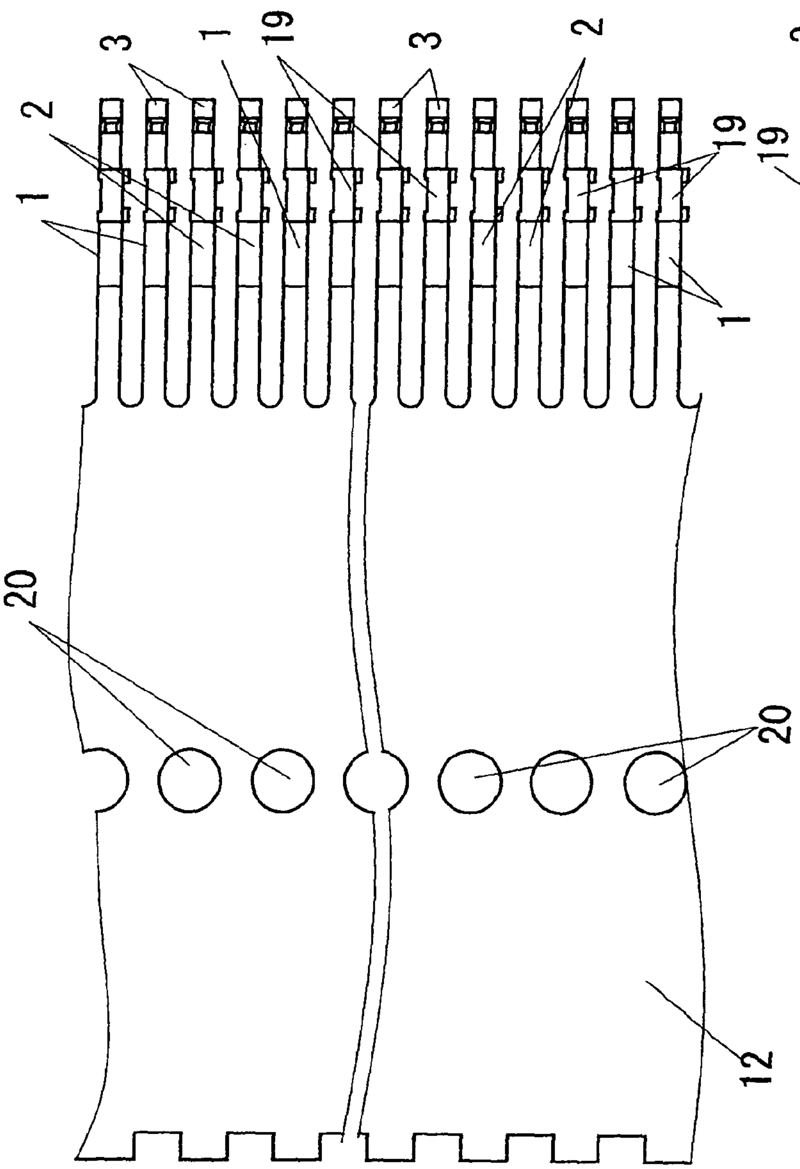
Figure 4B:
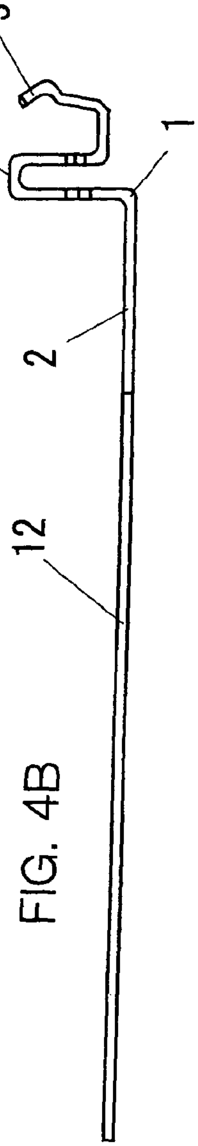

As mentioned above, since the contact 1 of the connector for mobile equipment is very small, a semi-finished blank 12, on which a lot of contacts 1 are arranged at a predetermined pitch, is manufactured in a manner so that a side of band metal plate is formed like teeth of a comb, and the teeth portion is bent to be a predetermined shape, as shown FIGS. 4A to 4C. At first, a foundation plating layer of nickel is formed on entire surface of the contact 1 owing to dipping in a nickel plating solution while the semi-finished blank 12 is conveyed in a lengthwise direction thereof. Subsequently, a gold plating layer is formed on entire surface of the contact 1 over the foundation plating layer owing to dipping in the gold plating solution while the semi-finished blank 12 is conveyed in a lengthwise direction thereof.

After forming the gold plating layer on the entire surface of the contact 1 including the terminal portion 2 and the contacting portion 3, the diffusion preventing area 6 is formed when a process, which will be described in each embodiment, is carried out at a portion between the terminal portion 2 and the contacting portion 3. The position of the diffusion preventing area 6 is not limited, so that it can be positioned at any portion between the terminal portion 2 and the contacting portion 3. In consideration of connecting strength of the terminal portion 2 and the wiring pattern on the printed circuit board 110, the diffusion of the solder, however, should be made smaller. Thus, it is preferable to provide the diffusion preventing area 6 at a position near to the terminal portion 2.

After forming the diffusion preventing area 6 between the terminal portion 2 and the contacting portion 3, the semi-finished blank 12 is press fitted or inserted into the socket base 101 as it is. After each contact 1 is fixed on the socket base 101, the contact 1 is cut off from the semi-finished blank 12. As a result, the socket 100 is completed. Subsequently, the socket 100 is disposed on the printed circuit board 110, as shown in FIG. 3. Owing to the terminal portions 2 of the contacts 1 are soldered on the printed circuit board 110, the socket 100 is mounted on the printed circuit board 110.

Even though the melted solder diffuses on the surface of the gold plating area 4 of the terminal portion 2, the diffusion of the melted solder stops at the boundary between the diffusion preventing area 6 and the gold plating area 4 due to low wetting property between the surface of the diffusion preventing area 6 and the solder. Consequently, it is possible to prevent not only the diffusion of the melted solder to the contacting portion 3, but also the reduction of the quantity of the solder remained at the terminal portion 2. Furthermore, the connecting strength of the terminal portion 2 on the printed circuit board 110 can be maintained higher.

First Embodiment

Subsequently, a first embodiment of the present invention is described. In the first embodiment, laser beams are irradiated on the surface of the gold plating layer of the contact 1, so that the gold plating layer is partially removed.

Figure 5:
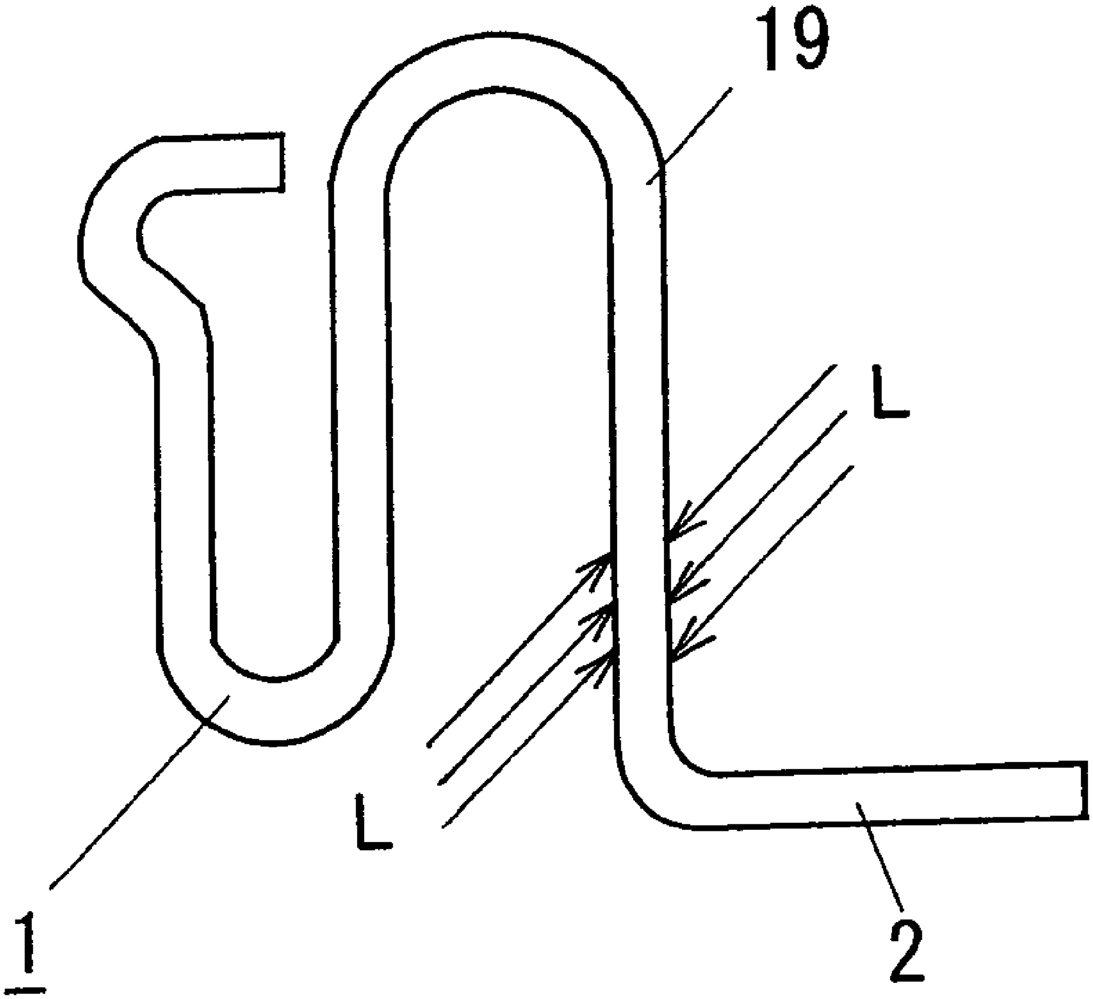
FIG. 5 is a side view showing a method for forming a diffusion preventing area in a first embodiment of the present invention.

As shown in FIG. 5, the laser beams L are irradiated on the surface of the contact 1 at a portion between the terminal portion 2 and the contacting portion 3. The portion, at which the laser beams L are irradiated, is not limited, if it is positioned between the terminal portion 2 and the contacting portion 3. It, however, is preferable to near the terminal portion 2. The same goes for the other embodiments.

Figure 6A:
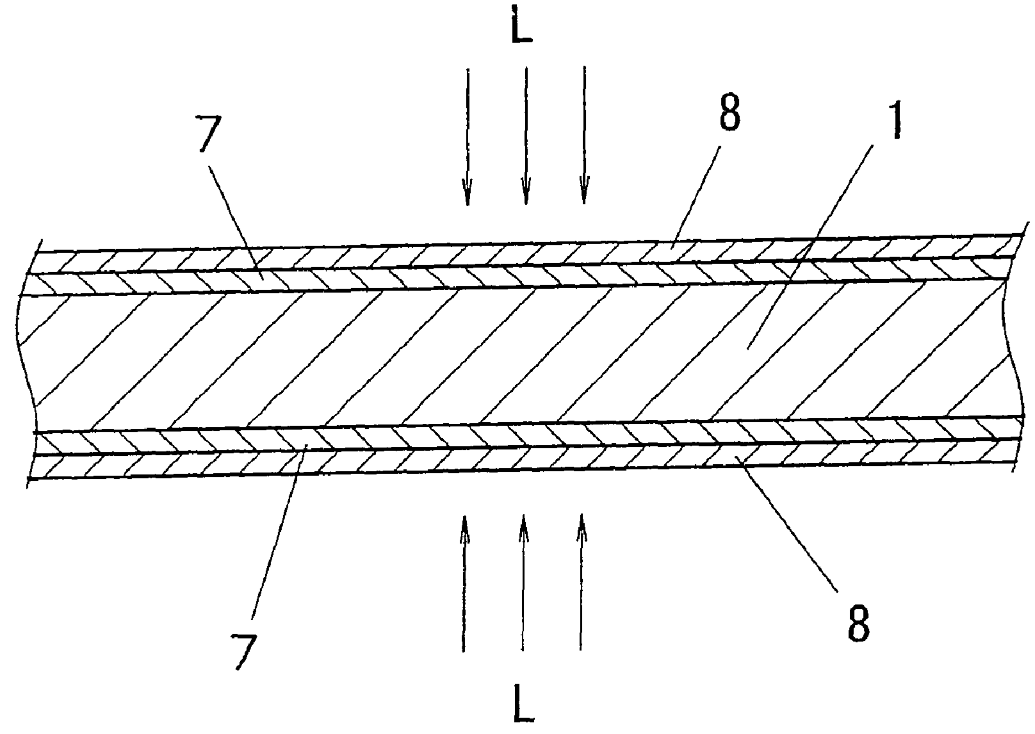
FIG. 6A is a sectional view showing a state that a laser beam is irradiated on a contact in the first embodiment.
Figure 6B:
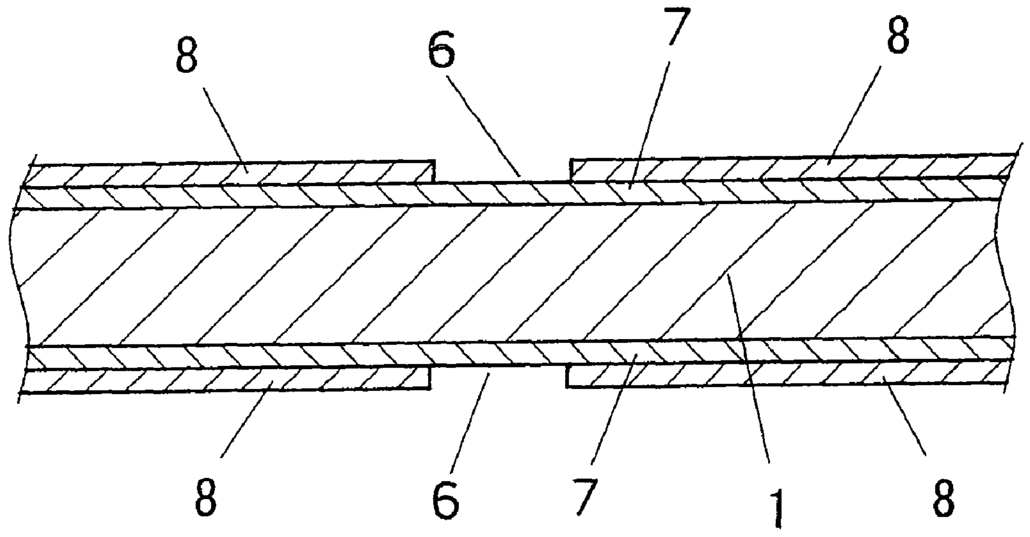
FIG. 6B is a sectional view showing a state that a gold plating layer on a surface of the contact is removed in the first embodiment.

As shown in FIG. 6A, the laser beams L are irradiated with using, for example, a semiconductor laser apparatus, at a predetermined position between the terminal portion 2 and the contacting portion 3 of the contact 1, in which the nickel plating layer 7 and the gold plating layer 8 are formed on entire surface including the terminal portion 2 and the contacting portion 3. The portion irradiated by the laser beams L is regionally heated owing to energy of the laser beams L, and the gold plating layer 8 on the surface is melted and evaporated. Consequently, the gold plating layer 8 at the portion irradiated by the laser beams L is partially removed, as shown in FIG. 6B. When the gold plating layer 8 on the surface is removed, the nickel plating layer 7 as the foundation plating is unsheathed. As mentioned above, since the wetting property between nickel and solder is lower, the portion where the gold plating layer 8 is removed serves as the diffusion preventing area 6 of the melted solder.

Since the laser beams L are used for removing the gold plating layer 8, it is possible to concentrate the energy in a minute area. Thus, the diffusion preventing area 6 can be formed precisely, even when the contact 1 is much smaller. Furthermore, since the power of the laser beams L can be controlled, it is possible to form the diffusion preventing area 6 precisely in a short time period without removing the nickel plating layer 7 as the foundation plating when the energy condition is properly selected corresponding to the thickness of the gold plating layer 8, and so on.

As the laser beams L, it is preferable to use one, for example, having a wavelength equal to or shorter than 1100 nm, in a range from 0.5 to 5 mJ/pulse of the energy per one pulse and in a range from 100 to 2000 $mJ/mm^2$ of the energy per a unit area. More preferably, it is preferable to use the laser beam in a range equal to or smaller than 3 mJ/pulse of the energy per one pulse and in a range equal to or smaller than 1200 $mJ/mm^2$ of the energy per a unit area.

If the energy of the laser beams L is much larger, there are possibilities that the nickel plating layer 7 below the gold plating layer 8 is further removed, and the material of the contact 1 is melted. For example, when the material of the contact 1 is copper, the copper below the nickel plating layer 7 is unsheathes when the laser beams L having superfluous energy are irradiated. Since the wetting property between copper and solder is higher, it, however, is impossible to prevent the diffusion of the melted solder at the portions where the copper is unsheathed. Furthermore, since copper has low corrosion resistance, the corrosion resistance of the contact will be reduced due to the unsheathing of copper. Accordingly, it is preferable to unsheathe the nickel plating layer 7 owing to removing only the gold plating layer 8 with controlling the energy of the laser beams L, as mentioned above.

Figure 7:
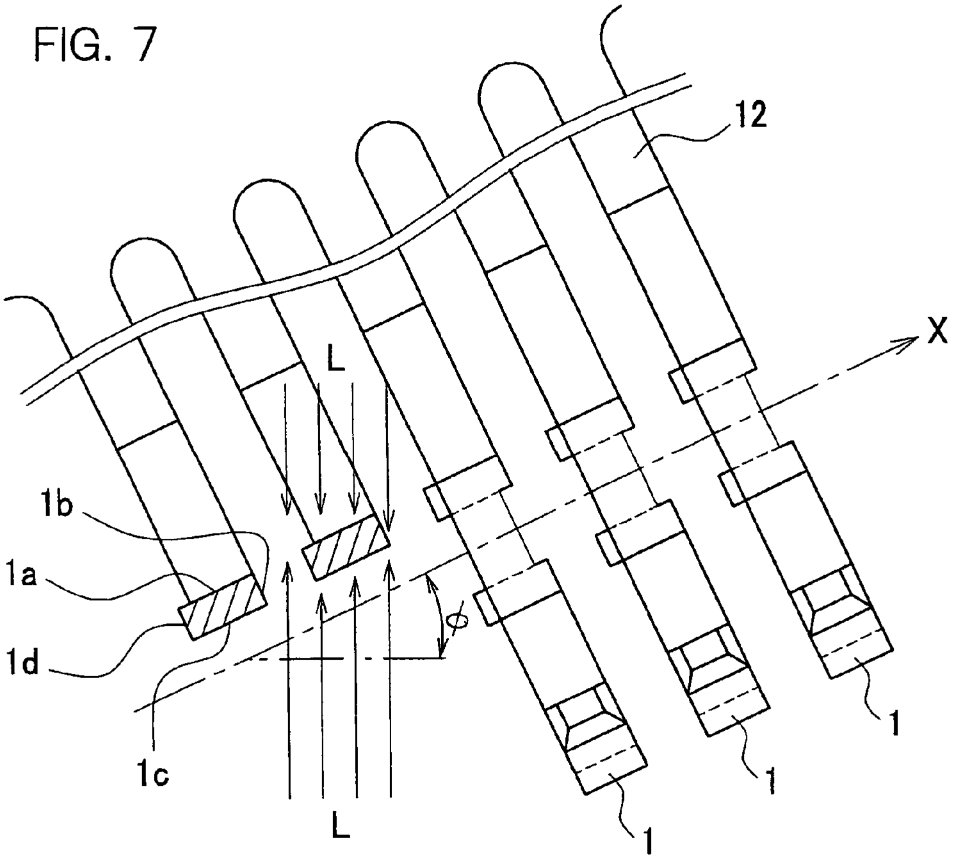
FIG. 7 is a drawing showing a direction for irradiating the laser bean to the semi-finished blank on which the contacts are arranged in the first embodiment.

Subsequently, a method for irradiating the laser beams L is described. As mentioned above, the contacts 1 are arranged at a predetermined pitch on the side of the semi-finished blank 12. Accordingly, it is necessary to irradiate the laser beams L evenly along circumferences of all the contacts 1 without omission under the condition of the semi-finished blank 12. Thus, the laser beams L are simultaneously irradiated to two sides 1*a* and 1*b* which cross substantially at right angle among four sides 1*a* to 1*d* of substantially a rectangular section of the contact 1, while the laser beams L are scanned for taking a predetermined angle $\phi$ with respect to the conveying direction X of the semi-finished blank 12, as shown in FIG. 7.

When the irradiation of the laser beams L with respect to two sides 1*a* and 1*b* from one side of the semi-finished blank 12 is completed, the semi-finished blank 12 is turned over or the laser beams L are scanned from the other side of the semi-finished blank 12, and the laser beams L are irradiated to two sides 1*c* and 1*d* on the opposite side of the semi-finished blank 12.

Figure 8:
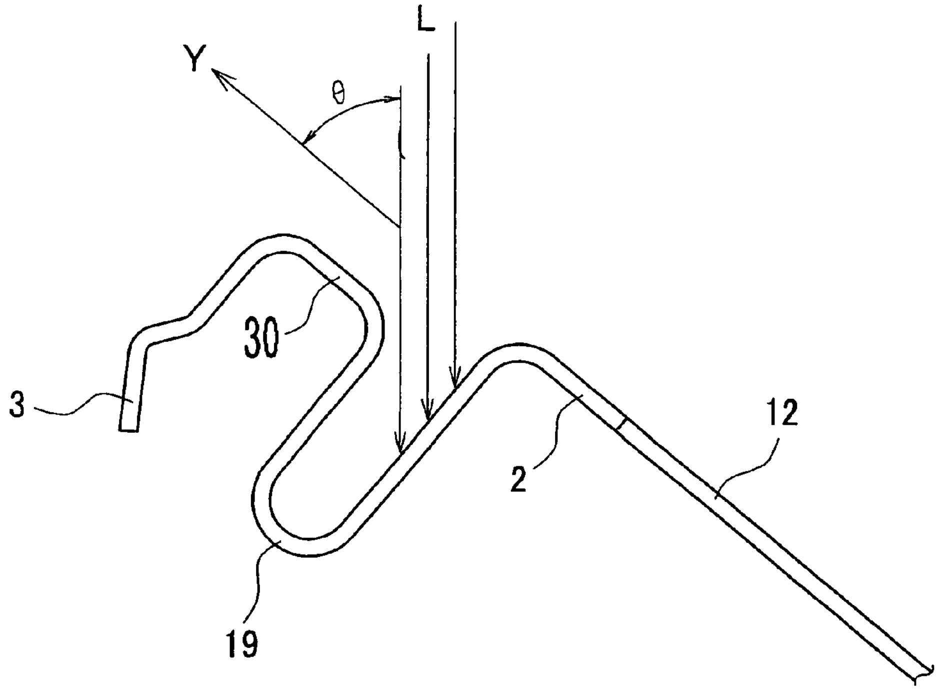
FIG. 8 is a drawing showing a direction for irradiating the laser beam observed from another direction.

Furthermore, the direction for irradiating the laser beams L is slanted by a predetermined angle $\theta$ with respect to a plate portion of the semi-finished blank 12 so as not to occur any portion where the laser beams L are not irradiated due to hidden by another portion of the contact 1 such as a flexion 30 corresponding to the shape of the contact 1, as shown in FIG. 8.

By such the processes, the laser beams L can be irradiated to all the four sides 1*a* to 1*d* of each contact 1 of the semi-finished blank 12 evenly and without omission while the scanning of the laser beams L twice.

Subsequently, a width W of the diffusion preventing area 6 functional for preventing the diffusion of the melted solder (see FIG. 2) and a diameter of the laser beams L are described. In the first embodiment, the nickel plating layer as the foundation plating is unsheathed owing to removing the gold plating layer on the surface serving as the diffusion preventing area 6. Even though the wetting property between nickel and solder is lower, the melted solder diffuses in the nickel plating layer, a little. Therefore, there is a lower limit of the width W necessary for preventing the diffusion of the melted solder. With respect to the contact of the minute connector for mobile equipment, the lower limit of the width W necessary for functioning the diffusion preventing area 6 was 0.13 mm, when it was obtained by experimental test. Accordingly, it is necessary to remove the gold plating layer owing to irradiating the laser beams L over the width equal to or wider than 0.13 mm.

Figure 9:
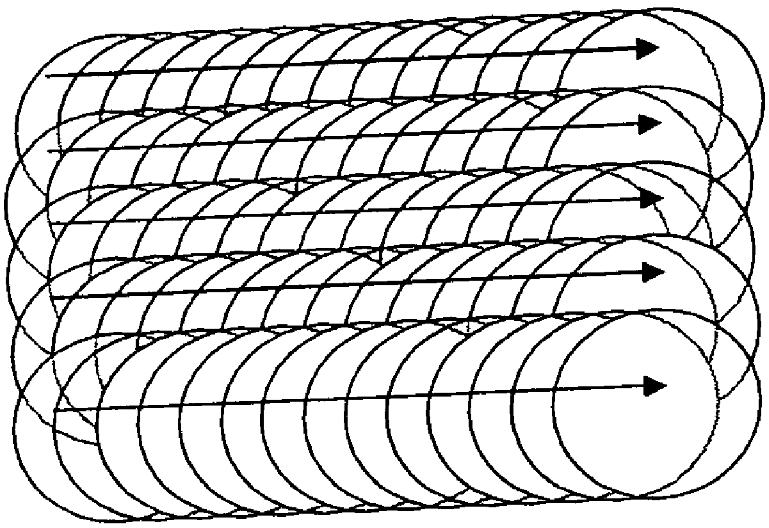
FIG. 9 is a drawing showing a method for irradiating the laser beams when a diameter of spot of the laser beam is smaller than a width of the diffusion preventing area.
Figure 10:
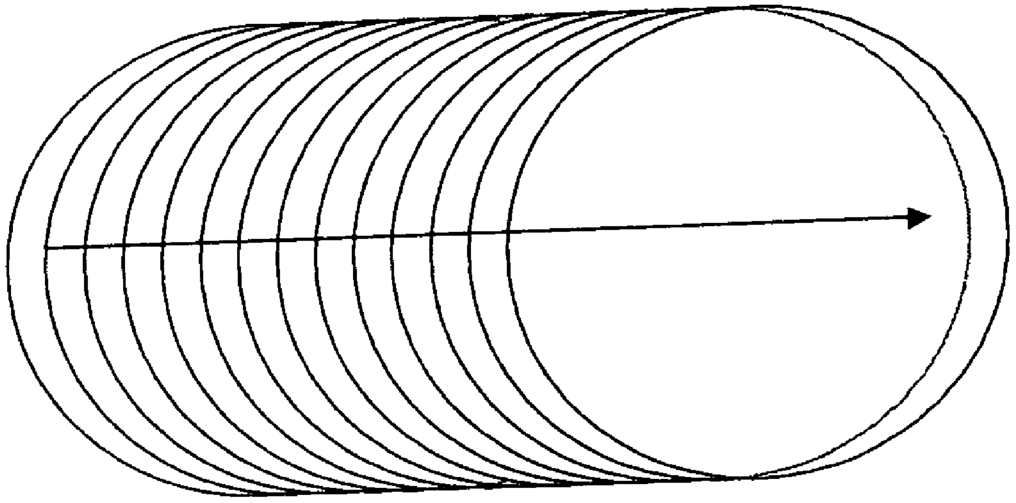
FIG. 10 is a drawing showing a method for irradiating the laser beams when a diameter of spot of the laser beam is wider than a width of the diffusion preventing area.

Various diameters of beam spots can be utilized as the laser beams L. When the laser beam having a diameter of the beam spot smaller than the width W necessary for serving as the diffusion preventing area 6 (for example, 0.05 mm in the example shown in FIG. 9) is used, the nuggets (traces of laser beam irradiation) having a nugget diameter of 0.05 mm are formed, so that the laser beams L must be scanned with irradiation more than twice (five times in the example shown in FIG. 9) with shifting a little in the widthwise direction of the diffusion preventing area 6, as shown in FIG. 9. Thus, it is necessary for scanning the laser beams L more than twice from one side of the semi-finished blank 12, so that it takes a good amount of time to remove the gold plating and causes cost rise. Furthermore, it is necessary to shift the scanning of the laser beams L in the widthwise direction of the diffusion preventing area 6, so that high precision of the scanning of the laser beams L or the conveyance of the semi-finished blank 12 is required. To the contrary, when the laser beam having a diameter of the beam spot larger than the width W necessary for serving as the diffusion preventing area 6 (for example, 0.15 mm in the example shown in FIG. 10) is used, the nuggets having the nugget diameter of about 0.15 mm are formed, so that it is possible to irradiate the laser beams L evenly along circumferences of all the contacts 1 without omission when the laser beams L are scanned once on one side of the semi-finished blank 12, or totally twice on both sides. Furthermore, it is no need to shift the scanning of the laser beams L in the widthwise direction of the diffusion preventing area 6, so that it is not long before removing the gold plating, and it is possible to reduce the cost. Still furthermore, the precision of the scanning of the laser beams L or the conveyance of the semi-finished blank 12 is not required so much.

Subsequently, a relation between the shift quantity B of the laser beams L and a width (overlapping width) H of overlapped portion of the laser beams L irradiated continuously twice while the laser beams L are irradiated with scanning is considered. When it was assumed that the diameter of beam spot of the laser beams L was 0.15 mm, the nugget diameter to be formed would become substantially 0.15 mm, so that variation of the overlapping width H was obtained while the shit quantity B was varied by little and little. The variation is shown in FIGS. 11A to 11E, and the values of the shift quantity B and the overlapping width H are shown in table 1 (the unit of the values in the table 1 is millimeter).

Hereupon, the overlapping width H is defined by the following equation when the nugget diameter is designated by a symbol D.

$$H=\sqrt{D^2-B^2}$$

TABLE 1

Figure 11A:
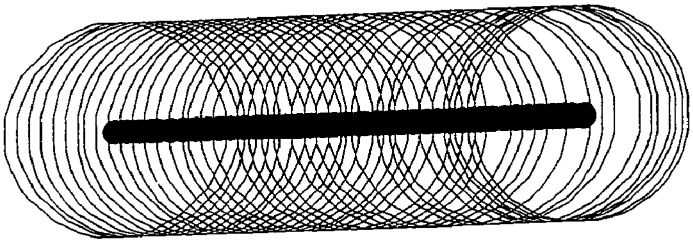
FIGS. 11A to 11E are drawings respectively showing states of overlapping of nuggets (traces of laser beam irradiation) when shifting widths of the beam spots at the laser beam irradiation are changed.
Figure 11B:
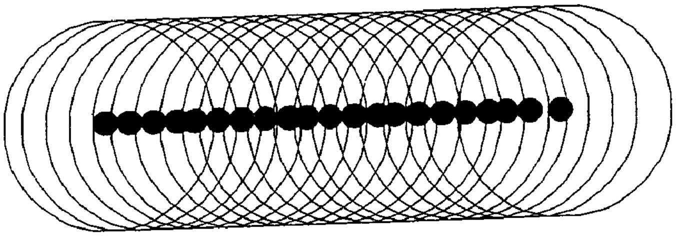
Figure 11C:
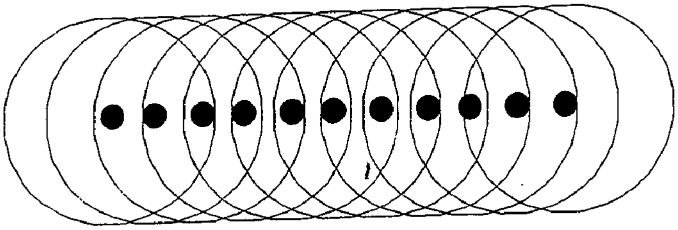
Figure 11D:
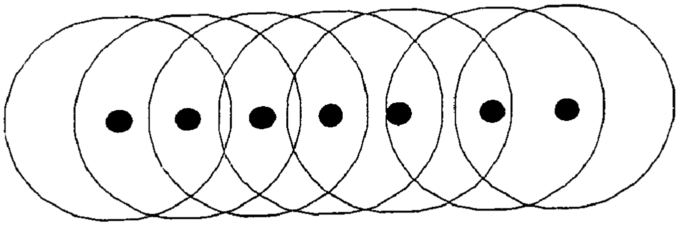
Figure 11E:
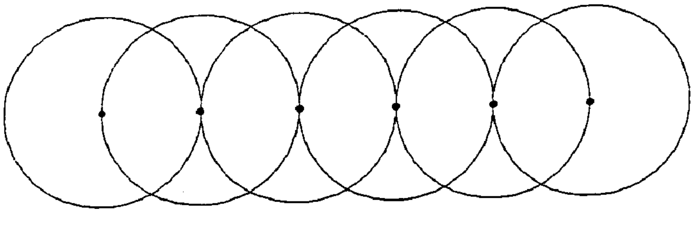
Figure 12:
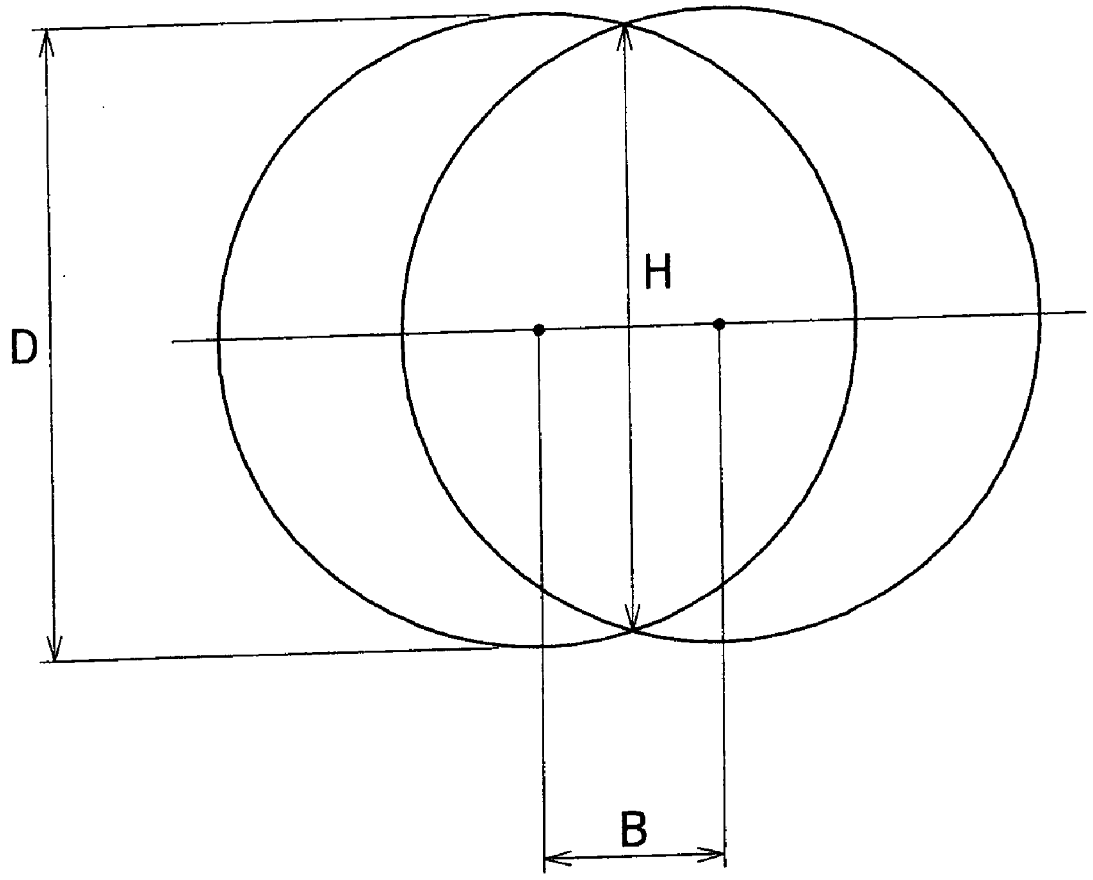
FIG. 12 is a drawing showing relations among a diameter of the beam spot, the shifting width of the beams spots and the overlapping width of the nuggets.

| FIG. No. | FIG. 11A | FIG. 11B | FIG. 11C | FIG. 11D | FIG. 11E |
|---|---|---|---|---|---|
| Shifting Quantity B | 0.008 | 0.016 | 0.032 | 0.048 | 0.075 |
| Overlapping Width H | 0.150 | 0.149 | 0.147 | 0.142 | 0.130 |

It is assumed that the gold plating layer can be removed by the irradiation of the laser beams L in one time. As can be seen from the table 1, it is possible to secure the width of 0/13 mm, which is necessary for functioning the diffusion preventing area 6, when the shift quantity B is made a half of the nugget diameter D, as shown in FIG. 11E. To the contrary, when the power of the laser beams L is smaller so that the gold plating cannot be removed in the irradiation in one time, it is possible to secure the energy necessary for removing the gold plating layer owing to reducing the shift quantity B and increasing the irradiation time of the laser beams L, as shown in FIGS. 11A and 11B. In either cases, there is a high possibility that the material of the contact 1 such as copper is unsheathed due to the nickel plating layer as the foundation plating is removed further to removing the gold plating layer in the region where the center of the beam spot passes, since irradiation quantity of the energy is larger. Therefore, it is preferable to select the power and the number of times for irradiating the laser beams L at most suitable conditions based on the experimental test.

Second Embodiment

Subsequently, a second embodiment of the present invention is described. In the second embodiment, the laser beams L having energy smaller than that of the laser beams L in the above-mentioned first embodiment are irradiated at a portion between the terminal portion 2 and the contacting portion 3 of the contact 1, so that the diffusion preventing area 6 is formed of alloying gold and nickel at the portion where the laser beams L are irradiated.

Figure 13A:
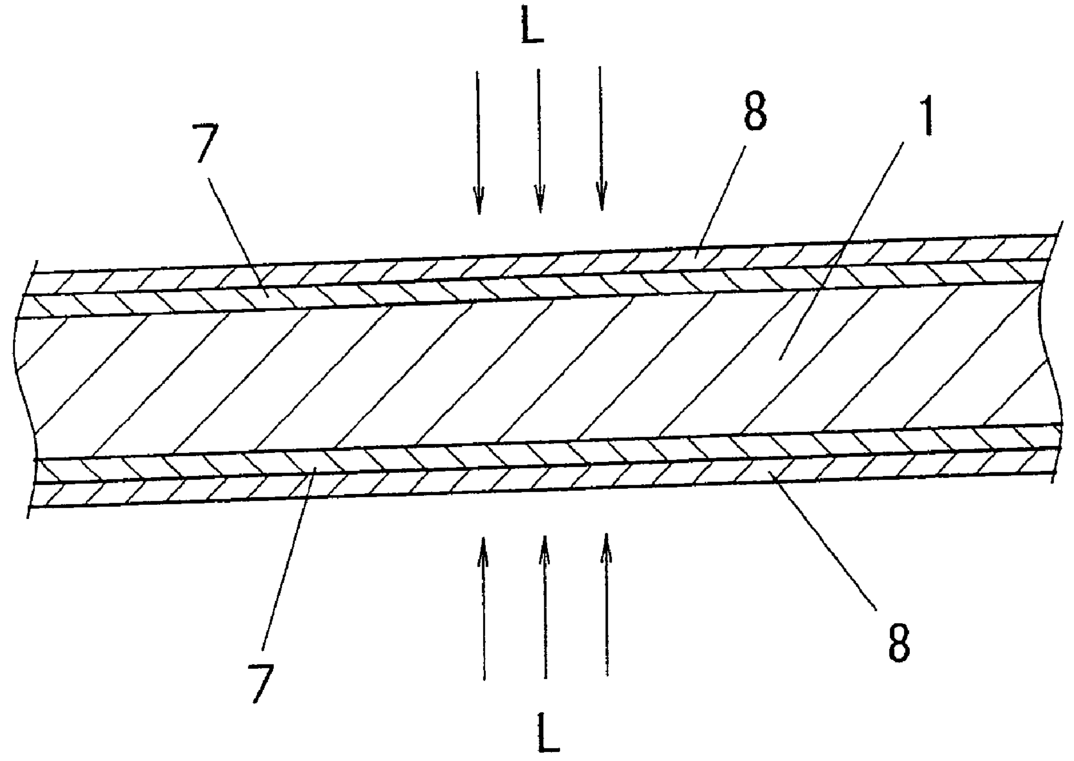
FIG. 13A is a sectional view showing a state for irradiating a laser beam to a contact in a method for forming a diffusion preventing area in a second embodiment of the present invention.
Figure 13B:
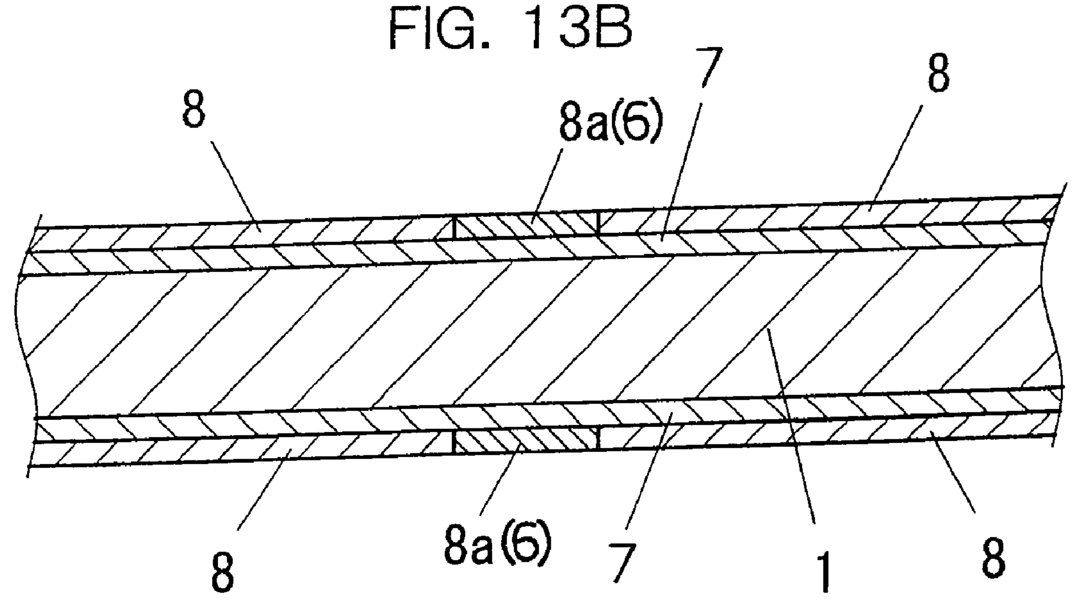
FIG. 13B is a sectional view showing a state that a metal alloy layer is formed of allowing nickel and gold on a surface of the contact in the second embodiment.

As shown in FIG. 13, when the laser beams L having predetermined power are irradiated at the portion between the terminal portion 2 and the contacting portion 3 of the contact 1, nickel in the nickel plating layer 7 below the gold plating layer 8 diffuses, so that metal alloy layer 8*a* of gold and nickel (Au—Ni) is formed at the portion where the laser beams L are irradiated, as shown in FIG. 13B. The wetting property of the metal alloy layer 8*a* with respect to solder is lower than the wetting property between gold and solder, similar to the wetting property between nickel and solder. Thus, when the metal alloy layer 8*a* is formed between the terminal portion 2 and the contacting portion 3, the diffusion of the solder stops at the boundary between the metal alloy layer 8*a* and the gold plating layer 8, so that the solder never diffuses on the metal alloy layer 8*a* any more, even though the melted solder diffuses along the surface of the gold plating layer 8 from the terminal portion 2. In other words, the metal alloy layer 8*a* of gold and nickel serves as the diffusion preventing area 6 of the melted solder.

Figure 14:
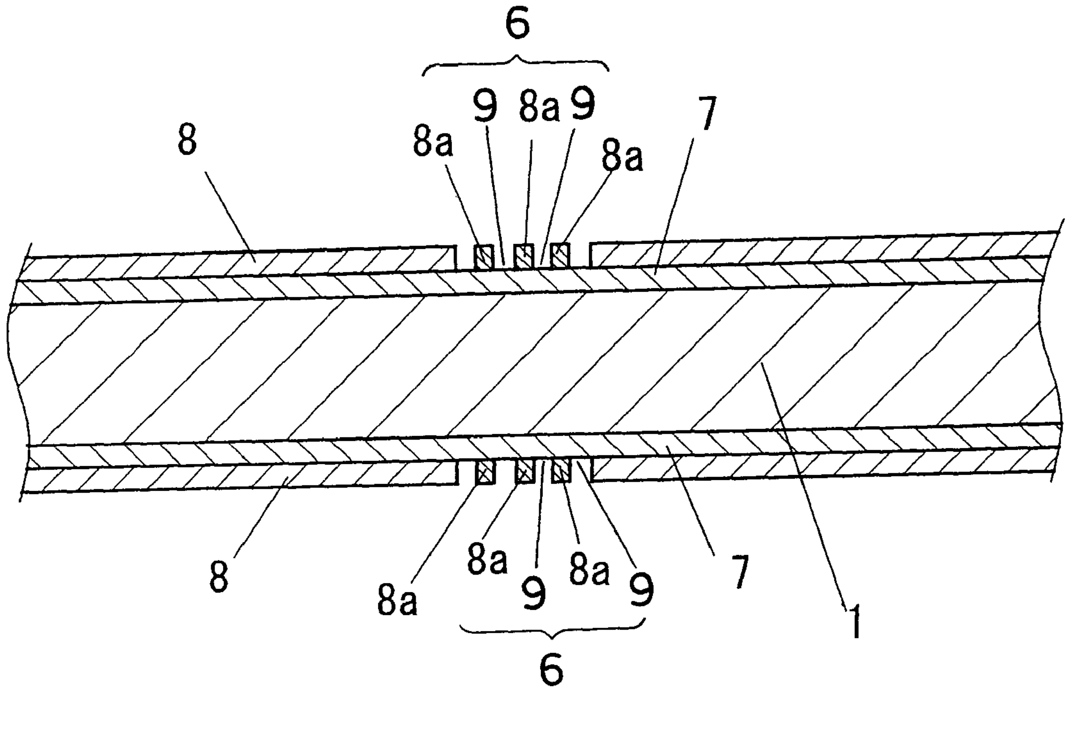
FIG. 14 is a sectional view showing a state that a gold plating layer on a surface of the contact is partially removed and metal alloy layers are partially formed of alloying gold and nickel owing to a modification of the method in the second embodiment.

As described in the first embodiment, the energy received from the laser beams L varies from place to place corresponding to the overlap of the laser beams L. Thus, it is possible to form the portions 9 where the nickel plating layer 7 is unsheathed by evaporating the gold plating layer 8 on the surface at the portions receiving higher energy from the laser beams L, and to form the metal alloy layer 8*a* of gold and nickel at the portions receiving lower energy from the laser beams L, as shown in FIG. 14. By such a configuration, the nickel plating layer 7 as the foundation plating is rarely evaporated, so that it is possible to prevent the material of the contact 1 such as copper be unsheathed. On the other hand, the portion 9 where the nickel plating layer 7 is unsheathed and the metal alloy layer 8*a* of gold and nickel respectively have lower wetting property with respect to solder, so that they can serve as the diffusion preventing area 6 for preventing the diffusion of the melted solder.

Third Embodiment

Subsequently, a third embodiment of the present invention is described. In the third embodiment, the diffusion preventing area 6 is formed by means of irradiation of the laser beam L after or before acting removing solution 40 of gold at a portion between the terminal portion 2 and the contacting portion 3 of the contact 1. Accordingly, the explanation of the common portion with the above-mentioned embodiments is omitted.

Figure 15A:
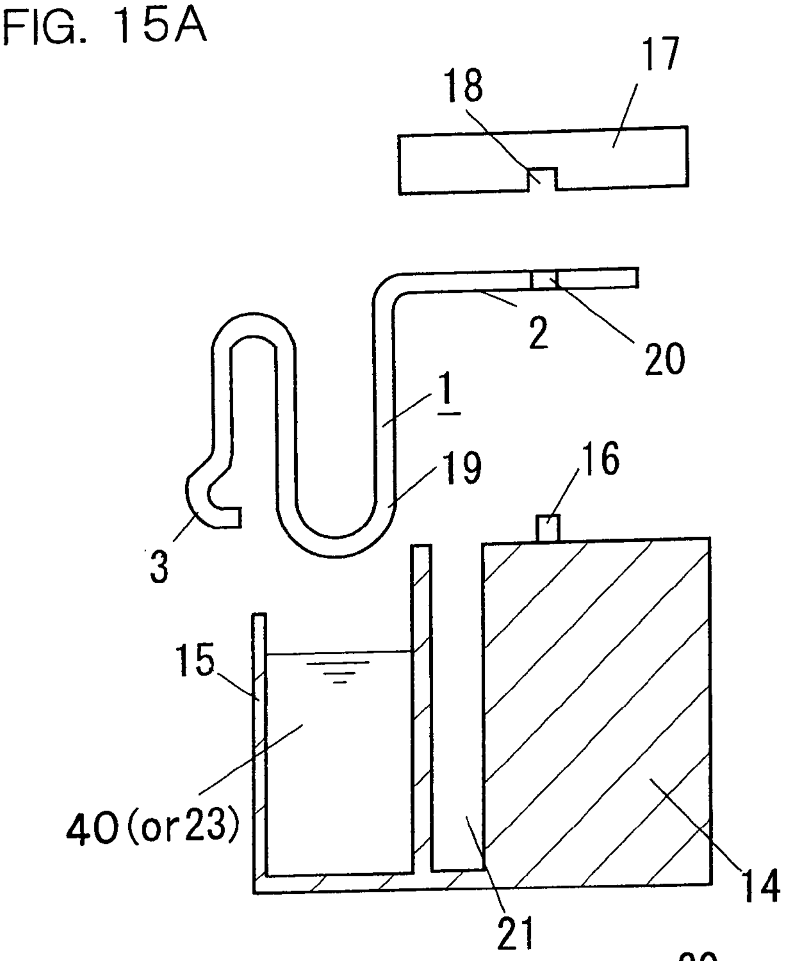
FIG. 15A is a sectional view showing a method for forming a diffusion preventing area before mounting a contact on a jig in a third embodiment of the present invention.
Figure 15B:
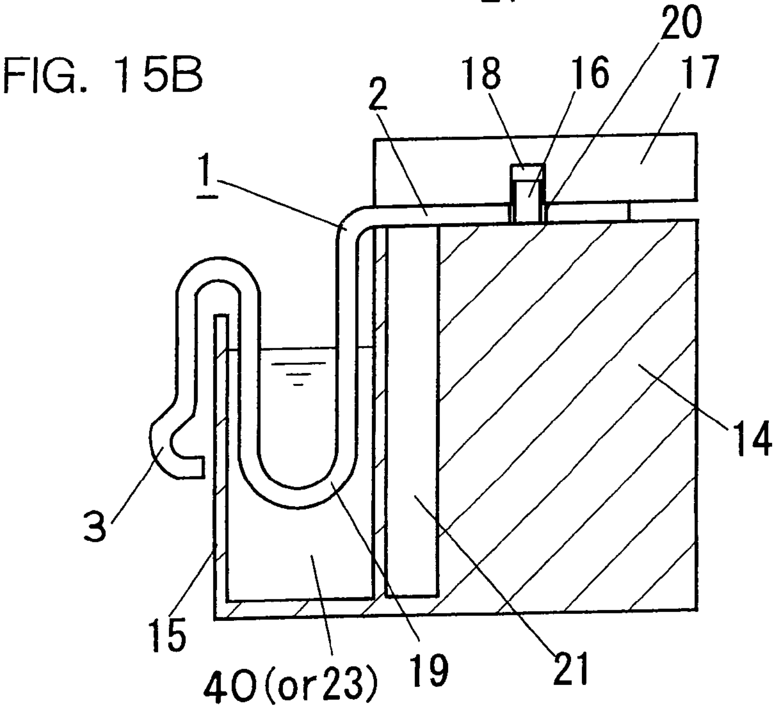
FIG. 15B is a sectional view showing the method after mounting the contact on the jig in the third embodiment.

In the method for forming the diffusion preventing area in the third embodiment, the flexion 19 between the terminal portion 2 and the contacting portion 3 of the contact 1 is dipped in the removing solution 40 of gold so that the gold plating layer at the portion is removed, as shown in FIGS. 15A and 15B. A bathtub 15 having an opening at topside is provided at an end of a jig 14, and the removing solution 40 of gold is filled in the bathtub 15. Furthermore, positioning protrusions 16 are provided on an upper face of the jig 14. Still furthermore, a pressing plate 17 having positioning recesses 18 provided corresponding to the positioning protrusions 16 are disposed above the jig 14. Still furthermore, a cavity 21 having an opening at topside is formed adjacent to the bathtub 15.

The contact 1 to which the foundation plating and the gold plating are carried out is mounted on the jig 14 as a state of the semi-finished blank 12. Since a lot of guide holes 20 are formed on the semi-finished blank 12 at a predetermined interval, the semi-finished blank 12 is positioned and fixed on the jig 14 when the guide holes 20 is fitted to the positioning protrusions 16. The bathtub 15 is designed to have dimensions in a manner so that only the flexion 19 between the terminal portion 2 and the contacting portion 3 which is bent like U-shape is fitted but the contacting portion 3 never be fitted therein. When the terminal portion 2 of the contact 1 is disposed in the jig 14 under a state that the flexion 19 faces downward, the flexion 19 is dipped into the removing solution 40 in the bathtub 15.

When the flexion 19 between the terminal portion 2 and the contacting portion 3 of the contact 1 is dipped in the removing solution 40, gold in the gold plating layer is dissolved as complex owing to oxidative reaction. Accordingly, the gold plating layer of the contact 1 dipped in the removing solution 40 is removed, so that the foundation plating layer is unsheathed.

At that time, even when the removing solution 40 comes up along an inner wall of the bathtub 15 due to surface tension, the removing solution never reaches top the terminal portion 2 according to the opening of the cavity 21 adjoining the bathtub 15. Consequently, it is possible to prevent the removing of the gold plating layer of the terminal portion 2. On the other hand, since the contacting portion 3 is not contacted with the jig 14, as shown in FIG. 15B, the gold plating layer of the contacting portion 3 is never removed.

Gold resolved in the removing solution 40 is collected as complexes state from the removing solution 40. The removing of the gold plating layer owing to the removing solution is carried out while the contacts 1 are on the semi-finished blank 12. It, however, is possible to remove the gold plating layer owing to the removing solution 40 after cutting off the contacts 1 from the semi-finished blank 12, depending on the circumstances.

The kind of the removing solution 40 is not limited, but it is possible to use one including potassium cyanide, nitro compound, lead oxide, or the like, as the major proportions. The time period for dipping the contact 1 in the removing solution 40 is selected in a range from several seconds to several minutes. Specifically, ENSTRIP Au-78M, Meltex Inc. is used as the removing solution 40, and the contact is dipped in about 15 sec.

After removing the gold plating layer of the flexion 19 between the terminal portion 2 and the contacting portion 3 of the contact 1 by this means, the laser beams L are irradiated at the portion where the gold plating layer 8 is removed owing to the method in accordance with the first or second embodiment, so that gold remained at the portion where the laser beams L are irradiated is evaporated or alloyed with nickel. According to the combination of the removing solution 40 and the irradiation of the laser beams L as just described, even if the gold plating layer 8 is not removed completely by the removing solution 40, the remained gold can be removed substantially completely or alloyed with nickel owing to the irradiation of the laser beams L, so that the diffusion preventing area 6 having low wetting property with respect to solder can be formed. Consequently, it is possible to prevent the diffusion of the melted solder from the terminal portion 2 to the contacting portion 3.

The energy of the laser beams L per one pulse and per a unit area can be selected at the discretion in a region by which the nickel plating layer 7 as the foundation plating and the material of the contact 1 (for example, copper) are not melted.

Alternatively to the above-mentioned description, it is possible to irradiate the laser beams L to a part of the flexion 19 between the terminal portion 2 and the contacting portion 3 of the contact 1 at first, and the portion irradiated by the laser beams L is dipped into the removing solution 40, subsequently. Specifically, the laser beams L are irradiated to the surface of the gold plating layer 8 formed on the surface of the contact 1 at a portion between the terminal portion 2 and the contacting portion 3 at first, so that the nickel plating layer 7 as the foundation plating is partially unsheathed by removing a part of gold at the portion or a part of gold at the portion is alloyed with nickel. Subsequently, the flexion 19 between the terminal portion 2 and the contacting portion 3 of the contact 1 is dipped into the removing solution 40 of gold, so that the remained gold after irradiating the laser beams L is removed. Since it is difficult to remove the gold which is alloyed with nickel by processing of removing solution 40, the metal alloy layer 8*a* of gold and nickel (see FIG. 13B) is unsheathes as the diffusion preventing area 6, as it is.

As mentioned above, the gold plating layer 8 can remove substantially completely from the diffusion preventing area 6 by means of the combination of the removing solution 40 and the laser beams L, so that it is possible to prevent the diffusion of the melted solder along the remained gold plating layer 8.

Fourth Embodiment

Figure 16A:
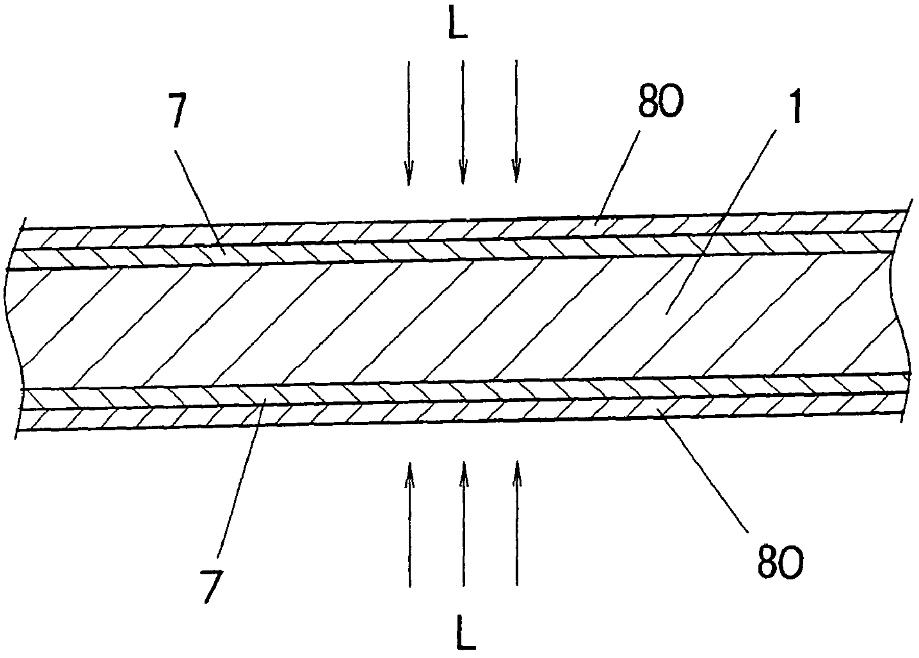
FIG. 16A is a sectional view showing a method for forming a diffusion preventing area in a fourth embodiment of the present invention.

Subsequently, a fourth embodiment of the present invention is described. In the above-mentioned first to third embodiment, the nickel plating layer 7 as the foundation plating and the gold plating layer 8 are formed on substantially entire surface of the contact. In the fourth embodiment, it is different that a gold-nickel (Au—Ni) alloy plating layer 80 is formed on the nickel plating layer 7 as the foundation plating, as shown in FIG. 16A.

The semi-finished blank 12, which is processed as shown in FIGS. 4A to 4C, is dipped into nickel plating solution while it is conveyed in lengthwise direction, so that the nickel plating layer 7 as the foundation plating is formed on entire surface of the contact 1. Subsequently, the semi-finished blank 12 is dipped into gold-nickel alloy plating solution while it is conveyed in lengthwise direction, so that the gold-nickel alloy plating layer 80 is formed on the nickel plating layer 7.

The kind of the nickel plating solution is not limited. For example, when nickel sulfamic acid plating solution is used, it is possible to increase electric current density, so that the productivity can be increased. The nickel plating layer 7 is formed so that the thickness of the layer becomes in a range from 0.3 to 10 μm. Furthermore, the kind of the gold-nickel alloy plating solution is not limited. For example, it is preferable to use one having the eutectoid ratio of gold: nickel is in a range from 70:30 to 99.9:0.1. As an example of the gold-nickel alloy plating solution, the products of NIKKO metal plating Co. Ltd., can be used. The gold-nickel alloy plating layer 80 is formed in a manner so that the thickness of the layer becomes in a range from 0.01 to 0.5 μm.

Figure 16B:
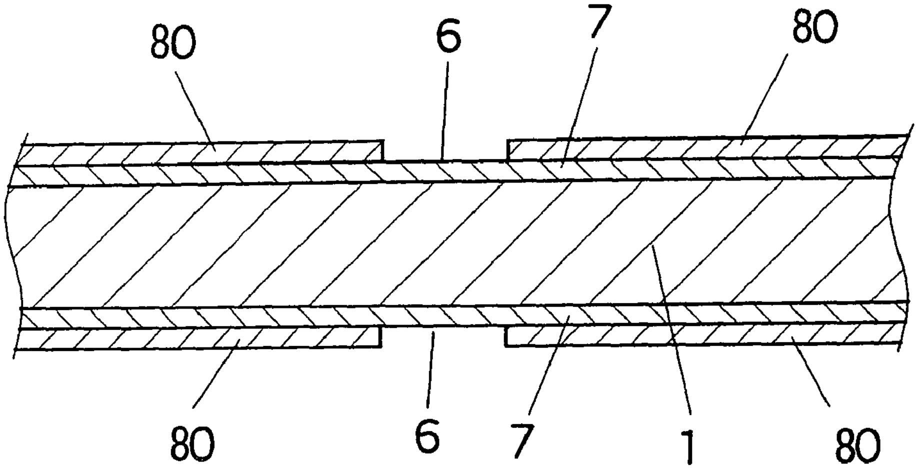
FIG. 16B is a sectional view showing the diffusion preventing area formed by the method in the fourth embodiment.

After forming the nickel plating layer 7 and the gold-nickel alloy plating layer 80 are formed on substantially entire surface of the contact 1, the laser beams L are irradiated at a portion where the diffusion preventing area 6 of the melted solder is to be formed, as shown in FIG. 16. The gold-nickel alloy plating layer 80 at the portion irradiated by the laser beams L is melted and evaporated. Consequently, the gold-nickel plating layer 80 is removed, so that the diffusion preventing area 6 where the nickel plating layer 7 as the foundation plating is unsheathed is formed.

Since the nickel plating layer 7 has the wetting property much lower than that of the gold-nickel alloy plating layer 80, owing to the diffusion preventing area 6, where the nickel plating layer 7 is unsheathed, formed between the terminal portion 2 and the contacting portion 3 of the contact 1, the diffusion of the solder is stopped at the diffusion preventing area 6, that is, at the boundary between the unsheathed nickel plating layer 7 and the gold-nickel alloy plating layer 80, even when the melted solder diffuses along the surface of the gold-nickel alloy plating layer 80 from the terminal portion 2, and the solder diffuses no more. Consequently, it is possible to prevent the diffusion of the solder to the contacting portion 3 and insufficient quantity of the solder remains at the terminal portion 2. Furthermore, the connecting strength of the terminal portion 2 on the printed circuit board 110 can be maintained higher.

For example, in the above-mentioned second embodiment, the metal alloy layer 8*a* of gold and nickel is formed owing to irradiation of the laser beams L to the gold plating layer 8, as shown in FIG. 13B. In such the case, the ratio of nickel is much larger than that of gold, so that the wetting property of the metal alloy layer 8*a* with respect to solder is lower similar to the wetting property between nickel and solder. Thus, the metal alloy layer 8*a* can serve as the diffusion preventing area 6. On the contrary, the ratio of gold is much larger than that of nickel in the gold-nickel alloy plating layer 80 in this embodiment, as mentioned above. Thus, the wetting property between the gold-nickel alloy plating layer 80 and solder is higher similar to the wetting property between gold and solder. Therefore, the gold-nickel alloy plating layer 80 is suitable as a surface treatment of an element to be soldered such as the contact 1, similarly to the gold plating layer 8.

Figure 17:
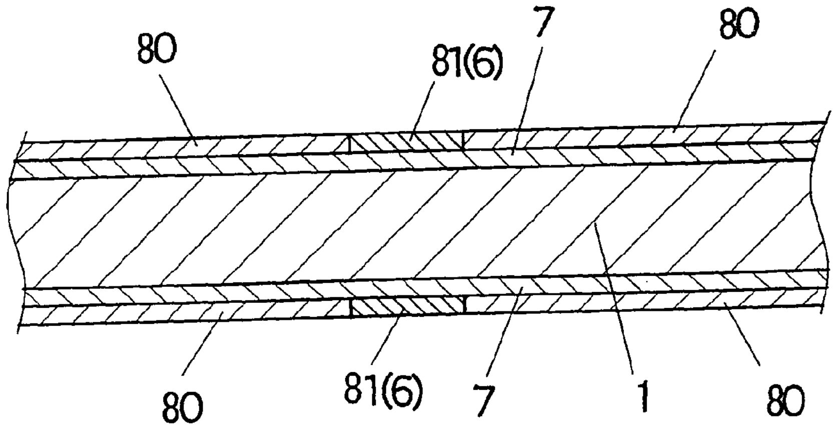
FIG. 17 is a sectional view showing a diffusion preventing area formed by a modification of the method in the fourth embodiment.

Furthermore, it is possible to form a diffusion layer 81, where nickel in the gold-nickel alloy plating layer 80 is diffused on a surface thereof, at a portion on the gold-nickel alloy plating layer 80 irradiated by the laser beams L owing to adjusting the power of the laser beam L, as shown in FIG. 17. In such the case, the ratio of nickel becomes larger than that of gold in the vicinity of the surface of the diffusion layer 81, so that the wetting property of the diffusion layer 81 with respect to solder becomes much lower. The diffusion layer 81 can serve as the diffusion preventing area 6 of the melted solder.

Figure 18:
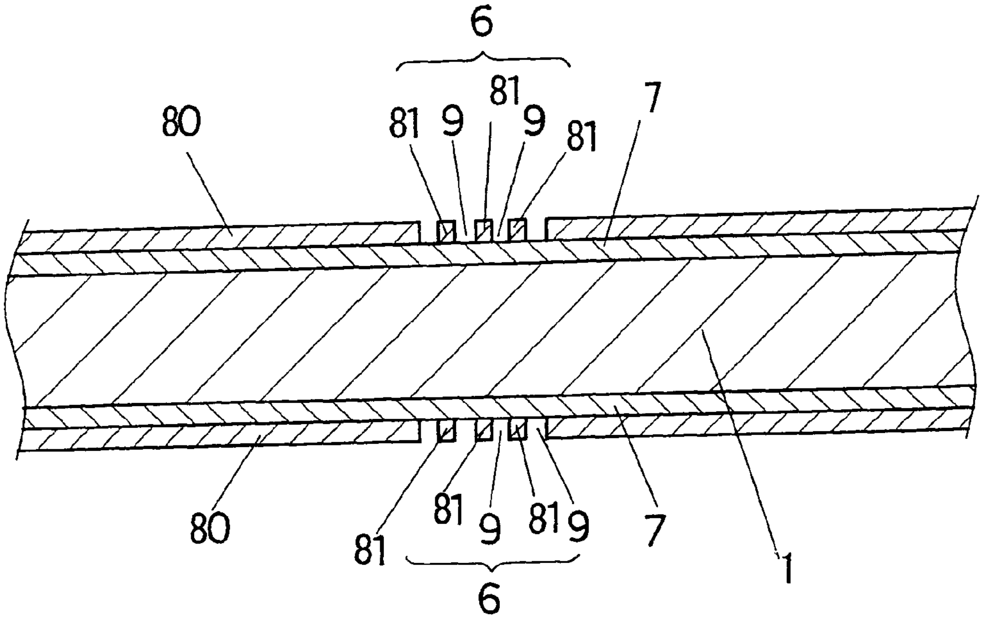
FIG. 18 is a sectional view showing a diffusion preventing area formed by another modification of the method in the fourth embodiment.

Furthermore, it is possible to unsheathe the nickel plating layer 7 by evaporating the gold-nickel alloy plating layer 80 on the surface at portions 9 where the energy received from the laser beams L is higher, and to form diffusion layers 81 by diffusing nickel in the gold-nickel alloy at portions where the energy received from the laser beams L is smaller, as shown in FIG. 18. By such a configuration, the nickel plating layer 7 as the foundation plating is never evaporated, so that it is possible to prevent the unsheathing the material of the contact 1 such as copper. On the other hand, the portions 9 where the nickel plating layer 7 is unsheathed and the diffusion layers 81 have low wetting property with respect to solder, so that they can serve as the diffusion preventing area 6 for preventing the diffusion of the melted solder.

Fifth Embodiment

Subsequently, a fifth embodiment of the present invention is described. In the above-mentioned fourth embodiment, the nickel plating layer 7 as the foundation plating is formed on substantially entire surface of the contact 1, and the gold-nickel (Au—Ni) alloy plating layer 80 is further formed on the nickel plating layer 7. In the fifth embodiment, a palladium-nickel (Pd—Ni) alloy plating layer 70 is further formed on the nickel plating layer 7 as the foundation plating, and the gold-nickel (Au—Ni) alloy plating layer 80 is formed on the palladium-nickel alloy plating layer 70.

The semi-finished blank 12, on which a lot of contacts 1 are arranged at a predetermined pitch, is dipped into nickel plating solution while it is conveyed in lengthwise direction, so that the nickel plating layer 7 as the foundation plating is formed on entire surface of the contact 1. Subsequently, the semi-finished blank 12 is dipped into palladium-nickel alloy plating solution while it is conveyed in lengthwise direction, so that the palladium-nickel alloy plating layer 70 is formed on the nickel plating layer 7. Furthermore, the semi-finished blank 12 is dipped into gold-nickel alloy plating solution while it is conveyed in lengthwise direction, so that the gold-nickel alloy plating layer 80 is formed on the palladium-nickel alloy plating layer 70 on the entire surface of the contact 1.

The kind of the nickel plating solution is not limited. For example, when nickel sulfamic acid plating solution is used, it is possible to increase electric current density, so that the productivity can be increased. The nickel plating layer 7 is formed so that the thickness of the layer becomes in a range from 0.3 to 10 μm. Furthermore, the kind of the palladium-nickel alloy plating solution is not limited, so that it is preferable to select one by which the electric current density can be increased and the productivity can be increased. The palladium-nickel alloy plating layer 70 is formed so that the thickness of the layer becomes ion a range from 0.01 to 1.0 μm. Still furthermore, the kind of the gold-nickel alloy plating solution is not limited. For example, it is preferable to use one having the eutectoid ratio of gold: nickel is in a range from 70:30 to 99.9:0.1. As an example of the gold-nickel alloy plating solution, the products of NIKKO metal plating Co. Ltd., can be used. The gold-nickel alloy plating layer 80 is formed in a manner so that the thickness of the layer becomes in a range from 0.01 to 0.5 μm.

Figure 19A:
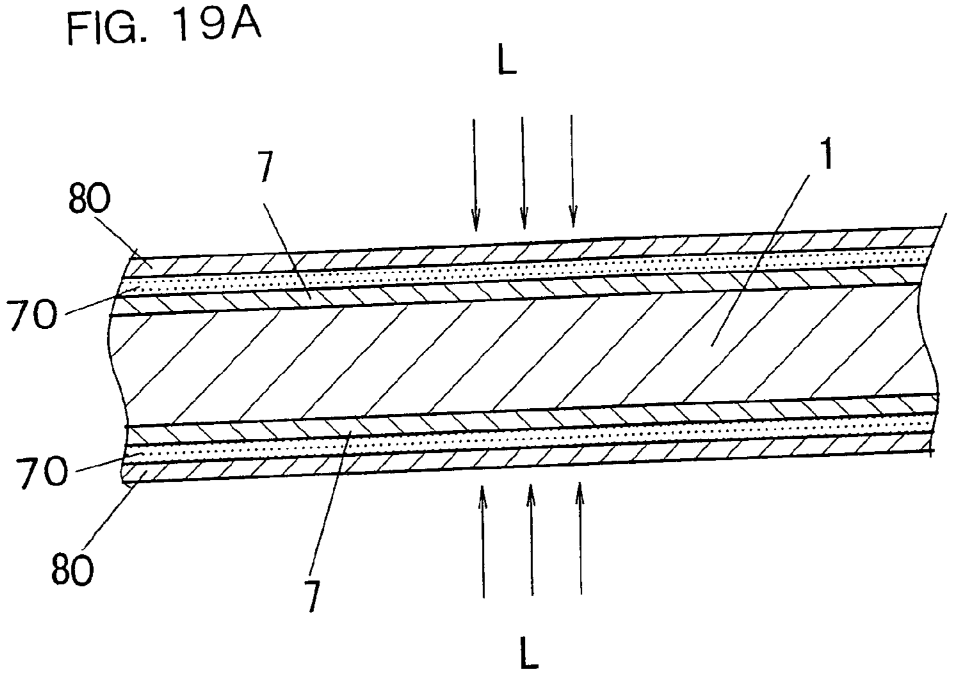
FIG. 19A is a sectional view showing a method for forming a diffusion preventing area in a fifth embodiment of the present invention.
Figure 19B:
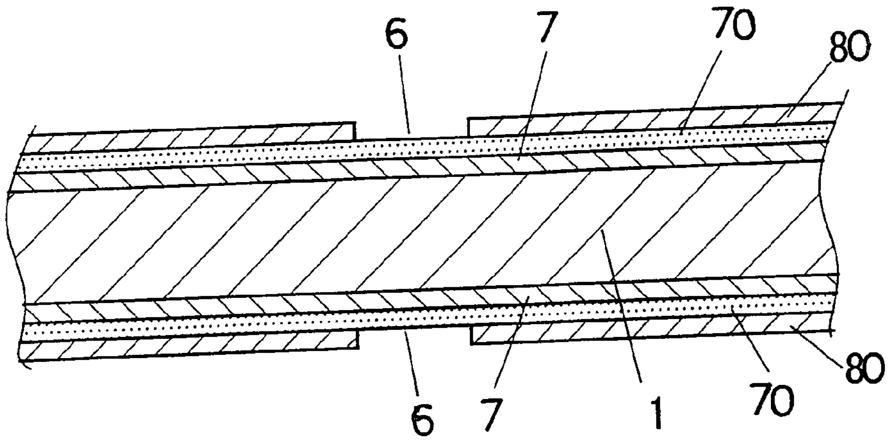
FIG. 19B is a sectional view showing the diffusion preventing area formed by the method in the fifth embodiment.

After forming the nickel plating layer 7, the palladium-nickel alloy layer 70 and the gold-nickel alloy plating layer 80 are formed on substantially entire surface of the contact 1, the laser beams L are irradiated at a portion where the diffusion preventing area 6 of the melted solder is to be formed, as shown in FIG. 19. The gold-nickel alloy plating layer 80 at the portion irradiated by the laser beams L is melted and evaporated. Consequently, the gold-nickel plating layer 80 is removed, so that the diffusion preventing area 6 where the palladium-nickel alloy plating layer 70 is unsheathed is formed.

Since the palladium-nickel alloy plating layer 70 has the wetting property much lower than that of the gold-nickel alloy plating layer 80, the diffusion preventing area 6 is formed by unsheathing the palladium-nickel alloy plating layer 70 at a portion between the terminal portion 2 and the contacting portion 3 of the contact 1. Even if the melted solder diffuses along the surface of the gold-nickel alloy plating layer 80 from the terminal portion 2, the diffusion of the solder is stopped at the diffusion preventing area 6, that is, at the boundary between the unsheathed palladium-nickel alloy plating layer 70 and the gold-nickel alloy plating layer 80, so that the solder diffuses no more. Consequently, it is possible to prevent the diffusion of the solder to the contacting portion 3 and insufficient quantity of the solder remains at the terminal portion 2. Furthermore, the connecting strength of the terminal portion 2 on the printed circuit board 110 can be maintained higher.

Furthermore, the palladium-nickel alloy layer 70 is superior to the nickel plating layer 7 as the foundation plating with respect to the corrosion resistance. It, however, is possible to increase the corrosion resistance than the case for unsheathing the nickel plating layer 7, even though the number of steps in the plating process is increased.

Figure 20:
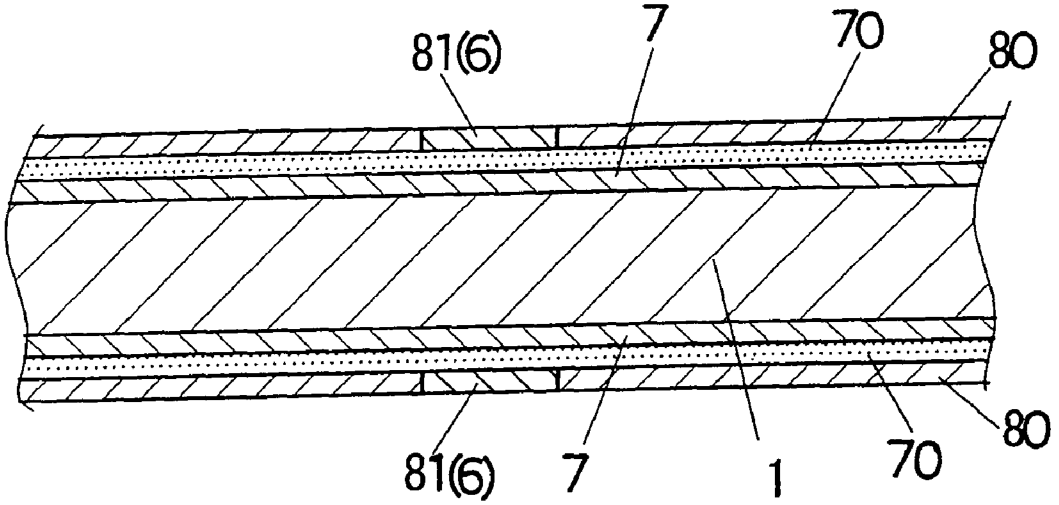
FIG. 20 is a sectional view showing a diffusion preventing area formed by a modification of the method in the fifth embodiment.

Furthermore, it is possible to form a diffusion layer 81, where nickel in the gold-nickel alloy plating layer 80 is diffused on a surface thereof, at a portion on the gold-nickel alloy plating layer 80 irradiated by the laser beams L owing to adjusting the power of the laser beam L, as shown in FIG. 20. In such the case, the ratio of nickel becomes larger than that of gold in the vicinity of the surface of the diffusion layer 81, so that the wetting property between the diffusion layer 81 and solder becomes much lower. The diffusion layer 81 can serve as the diffusion preventing area 6 of the melted solder.

Figure 21:
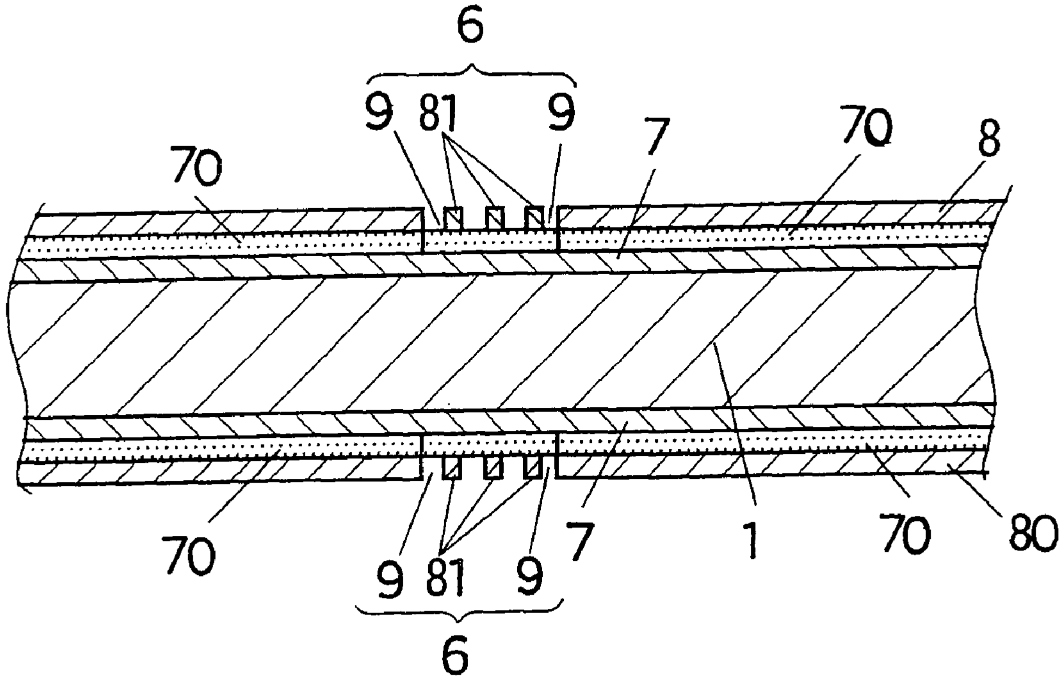
FIG. 21 is a sectional view showing a diffusion preventing area formed by another modification of the method in the fifth embodiment.

Furthermore, it is possible to unsheathe the palladium-nickel alloy plating layer 70 by evaporating the gold-nickel alloy plating layer 80 on the surface at portions 9 where the energy received from the laser beams L is higher, and to form diffusion layers 81 by diffusing nickel in the gold-nickel alloy at portions where the energy received from the laser beams L is smaller, as shown in FIG. 21. By such a configuration, the nickel plating layer 7 as the foundation plating is never evaporated, so that it is possible to prevent the unsheathing the material of the contact 1 such as copper. On the other hand, the portions 9 where the palladium-nickel alloy plating layer 70 is unsheathed and the diffusion layers 81 have low wetting property with respect to solder, so that they can serve as the diffusion preventing area 6 for preventing the diffusion of the melted solder.

Other Embodiments

In the above-mentioned embodiments including the irradiation process of the laser beams L, there might be the case that impurity such as carburet is adhered on the surface between the terminal portion 2 and the contacting portion 3 of the contact 1 after irradiating the laser beams L. When such the impurity is left as it is, it will cause the obstruction in after-treatment, so that it is difficult to obtain the contact 1 having high reliability. Thus, when the laser beams L are irradiated at a portion between the terminal portion 2 and the contacting portion 3, it is possible to dip the portion into cleaning fluid 23 with using, for example, the jig 14 shown in FIGS. 15A and 15B. The kind of the cleaning fluid 23 is not limited when it can remove the impurity. It, however, is possible to use the cleaning fluid, for example, alcohols solvent. When the impurity is adhered on a portion except the portion between the terminal portion 2 and the contacting portion 3, it is possible to dip the portion into the cleaning fluid 23 so that the impurity is removed. By means of removing the impurity adhered on the surface of the contact 1, there is no obstruction in after-treatment of the contact 1, even though the number of steps of the manufacturing process is increased. Consequently, a reliable contact 1 can be obtained.

Furthermore, the above-mentioned embodiments describe the cases for forming the diffusion preventing area of melted solder on the contact for a connector. The present invention, however, is not limited in this use, and it is possible to apply to, for example, electrically conductive leads provided on a package of a surface mounting semiconductor device. That is, the package of the surface mounting semiconductor device is used as an element to be mounted on the printed circuit board, similar to the connector. The mounting of the package of the surface mounting semiconductor device is carried out that the package is disposed above the printed circuit board, and the front ends of the leads provided on the package are soldered on the printed circuit board. In this case, it is possible to prevent the diffusion of the melted solder from the front ends of the leads to bases (roots) of the leads.

This application is based on Japanese patent applications 2002-297880, 2003-114759 and 2003-185748 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

The invention claimed is:

1. A contact for a connector comprising:

a terminal portion provided in the vicinity of an end and a contacting portion provided in the vicinity of the other end of the contact, which are formed by processing a metal material into a predetermined shape;

a foundation nickel plating layer and a gold plating layer or a metal alloy plating layer including gold, which are formed on substantially entire surface of the contact including the terminal portion and the contacting portion; and a diffusion preventing area formed between the terminal portion and the contacting portion by irradiating laser beams on the gold plating layer or the metal alloy plating layer including gold, which has low wetting property with respect to solder so that melted solder rarely diffuses thereon, wherein the diffusion preventing area has the foundation nickel plating layer unsheathed owing to evaporation and removing of at least a part of gold or metal alloy including gold, and at least one selected among a metal alloy layer formed of alloying gold and nickel, a diffusion layer formed of diffusing a material except gold of the metal alloy including gold, and a metal alloy layer which is formed of evaporation and removing at least a part of gold and alloying remained gold and nickel.

2. A manufacturing method of an element to be soldered comprising:

processing a metal material into a predetermined shape in a manner so that a terminal portion is formed in the vicinity of an end of the element;

forming a foundation nickel plating layer and a gold plating layer or a metal alloy plating layer including gold on substantially entire surface of the element including the terminal portion; and forming a diffusion preventing area, which has the foundation nickel plating layer unsheathed due to evaporation and removal of at least a part of gold or metal alloy including gold, and at least one selected among a metal alloy layer formed of alloying gold and nickel, a diffusion layer formed of diffusing a material except gold of the metal alloy including gold, and a metal alloy layer which is formed of evaporation and removing at least a part of gold and alloying remaining gold and nickel, and has low wetting property with respect to solder so that the melted solder rarely diffuses thereon, owing to irradiating laser beams on the gold plating layer or the metal alloy plating layer including gold at a portion between the terminal portion and a portion not to be soldered in the air.

3. The manufacturing method of the element to be soldered in accordance with claim 2, wherein the diffusion preventing area is formed in a manner so that the foundation nickel plating layer is unsheathed owing to evaporation and removing of at least a part of gold or metal alloy including gold at a portion irradiated by laser beams when the laser beams are irradiated on the gold plating layer or the metal alloy plating layer including gold.

4. The manufacturing method of the element to be soldered in accordance with claim 2, wherein at least a part of the diffusion preventing area is a metal alloy layer formed of alloying gold and nickel at a portion irradiated by laser beams when the laser beams are irradiated on the gold plating layer.

5. The manufacturing method of the element to be soldered in accordance with claim 2, wherein at least a part of the diffusion preventing area is a diffusion layer formed of diffusing a material except gold of the metal alloy on a surface at a portion irradiated by laser beams when the laser beams are irradiated on the metal alloy plating layer.

6. The manufacturing method of the element to be soldered in accordance with claim 2, wherein the diffusion preventing area is a metal alloy layer which is formed of evaporation and removing at least a part of gold and alloying remained gold and nickel.

7. The manufacturing method of the element to be soldered in accordance with claim 2, wherein a removing solution of gold is acted to the gold plating layer or the metal alloy plating layer including gold at a portion including at least an area where the laser beams will be irradiated, before irradiating the laser beams.

8. The manufacturing method of the element to be soldered in accordance with claim 2, wherein a removing solution of gold is acted on the gold plating layer or the metal alloy plating layer including gold at a portion including at least an area where the laser beams were irradiated, after irradiating the laser beams.

9. The manufacturing method of the element to be soldered in accordance with claim 2, wherein the foundation plating layer is a nickel plating layer.

10. The manufacturing method of the element to be soldered in accordance with claim 2, wherein a palladium-nickel alloy plating layer formed on the foundation nickel plating layer.

11. The manufacturing method of the element to be soldered in accordance with claim 2, wherein the metal alloy including gold is a gold-nickel alloy.

12. The manufacturing method of the element to be soldered in accordance with claim 2, wherein the laser beams are irradiated at a portion in the vicinity of the terminal portion.

13. The manufacturing method of the element to be soldered in accordance with claim 2, wherein laser beams in a range from 0.5 to 5 mJ/pulse of the energy per one pulse and in a range from 100 to 2000 $mJ/mm^2$ of the energy per a unit area are used.

14. The manufacturing method of the element to be soldered in accordance with claim 2, wherein laser beams in a range equal to or smaller than 3 mJ/pulse of the energy per one pulse and in a range equal to or smaller than 1200 $mJ/mm^2$ of the energy per a unit area are used.

15. The manufacturing method of the element to be soldered in accordance with claim 2, wherein the laser beams have a wavelength equal to or shorter than 1100 nm.

16. The manufacturing method of the element to be soldered in accordance with claim 2, wherein the laser beams have a beam spot diameter larger than a predetermined width of the diffusion preventing area necessary for preventing diffusion of melted solder, and the laser beams are irradiated with sifting a predetermined pitch in a predetermined direction so as to form overlapping portion of adjoining nuggets, and the width of the overlapping portion is wider than a predetermined width necessary for preventing the diffusion of melted solder.

17. The manufacturing method of the element to be soldered in accordance with claim 16, wherein the element to be soldered is conveyed as a state of semi-finished blank in which a plurality of the elements is arranged at a predetermined pitch on a side of band metal plate; and the laser beams are irradiated to two sides of the element to be soldered in a section parallel to a conveying direction of the semi-finished blank in a direction having a predetermined angle except 90 degrees with respect to the conveying direction of the semi-finished blank.

18. The manufacturing method of the element to be soldered in accordance with claim 2, wherein the element to be soldered is a contact for a connector, and a contacting portion is formed in the vicinity of an opposite end of the terminal portion.

* * * * *